United States Patent [19]
Houston et al.

[11] Patent Number: 6,106,116
[45] Date of Patent: Aug. 22, 2000

[54] BIASED EYEGLASS FRAMES

[75] Inventors: Malcolm Neal Houston, Foothill Ranch, Calif.; James H. Jannard, Eastsound, Wash.; Carlos D. Reyes, Gardnerville, Nev.; Ryan Saylor, Trabuco Canyon, Calif.

[73] Assignee: Oakley, Inc., Foothill Ranch, Calif.

[21] Appl. No.: 09/149,317

[22] Filed: Sep. 8, 1998

Related U.S. Application Data

[63] Continuation of application No. 08/780,637, Jan. 8, 1997, Pat. No. 5,805,261, which is a continuation-in-part of application No. 08/681,777, Jul. 29, 1996, Pat. No. 5,708,489, which is a continuation-in-part of application No. 08/416,211, Apr. 4, 1995, Pat. No. 5,541,674.

[51] Int. Cl.$^7$ .................................................. G02C 1/00
[52] U.S. Cl. .............................................. 351/41; 351/159
[58] Field of Search .................................. 351/126, 124, 351/128, 129, 133, 130, 136, 137, 135, 41, 158, 140, 159

[56] References Cited

U.S. PATENT DOCUMENTS

| | | |
|---|---|---|
| D. 365,591 | 12/1995 | Jannard et al. . |
| D. 369,375 | 4/1996 | Jannard et al. . |
| 1,332,410 | 3/1920 | Potts . |
| 1,354,040 | 9/1920 | Hammon . |

(List continued on next page.)

FOREIGN PATENT DOCUMENTS

| | | |
|---|---|---|
| 0 456 321 | 5/1949 | Canada . |
| 0 121 018 A2 | 10/1984 | European Pat. Off. . |
| 0 339 359 A1 | 11/1989 | European Pat. Off. . |
| 0 496 292 A1 | 1/1991 | European Pat. Off. . |
| 0 446 698 A2 | 9/1991 | European Pat. Off. . |
| 852306 | 10/1939 | France . |
| 1126329 | 11/1956 | France . |
| 2088866 | 1/1972 | France . |
| 2148866 | 3/1973 | France . |
| 2 271 593 | 12/1975 | France . |
| 2 388 293 | 4/1977 | France . |
| 2 511 903 | 3/1982 | France . |
| 2 626 086 | 7/1989 | France . |
| 2 626 683 | 8/1989 | France . |
| 2 688 322 | 9/1993 | France . |
| 2 740 231 | 7/1989 | Germany . |
| 798331 | 3/1936 | Italy . |
| 2-19021 | 2/1990 | Japan . |

(List continued on next page.)

OTHER PUBLICATIONS

Matsuura and Thompson, "The Consumers Choice in Athletic Eyewear", Doctoral Thesis, Pacific University College of Optometry, May 1993.

*Primary Examiner*—Hung Xuan Dang
*Attorney, Agent, or Firm*—Knobbe, Martens, Olson & Bear, LLP

[57] ABSTRACT

Disclosed are dimensionally stable eyeglass orbitals, pivotably mounted in an eyeglass frame. In one embodiment, the eyeglass orbitals are investment cast from substantially pure titanium or a titanium based alloy. The orbitals hold the lenses in the as-worn orientation such that the optical centerline of each lens extends in a predetermined relationship with respect to the wearer's theoretical straight ahead line of sight.

21 Claims, 13 Drawing Sheets

U.S. PATENT DOCUMENTS

| | | |
|---|---|---|
| 1,619,341 | 3/1927 | Gagnon . |
| 1,697,030 | 1/1929 | Tillyer . |
| 1,741,536 | 12/1929 | Rayton . |
| 1,910,466 | 5/1933 | Glancy . |
| 1,942,400 | 1/1934 | Glancy . |
| 2,103,575 | 12/1937 | Diggins . |
| 2,406,608 | 8/1946 | Joyce . |
| 2,442,849 | 6/1948 | Glazer . |
| 3,229,303 | 1/1966 | Jonassen . |
| 3,395,964 | 8/1968 | Nieder . |
| 3,532,189 | 10/1970 | Petito et al. . |
| 3,552,840 | 1/1971 | Braget . |
| 3,586,448 | 6/1971 | Beasse . |
| 3,880,502 | 4/1975 | Uribe . |
| 3,884,561 | 5/1975 | Kodys . |
| 4,204,750 | 5/1980 | Hilbert . |
| 4,271,537 | 6/1981 | Bowlus et al. . |
| 4,271,538 | 6/1981 | Montesi et al. . |
| 4,515,448 | 5/1985 | Tackles . |
| 4,611,371 | 9/1986 | Fujino et al. . |
| 4,613,217 | 9/1986 | Fuerter et al. . |
| 4,736,466 | 4/1988 | Kallstrom . |
| 4,737,918 | 4/1988 | Langlois et al. . |
| 4,741,611 | 5/1988 | Burns . |
| 4,761,315 | 8/1988 | Logan et al. . |
| 4,859,048 | 8/1989 | Jannard . |
| 4,867,550 | 9/1989 | Jannard . |
| 4,976,529 | 12/1990 | Segoshi et al. . |
| 5,050,979 | 9/1991 | Shinohara . |
| 5,064,463 | 11/1991 | Ciomek . |
| 5,131,101 | 7/1992 | Chin . |
| 5,208,614 | 5/1993 | Jannard . |
| 5,220,689 | 6/1993 | Miller . |
| 5,287,562 | 2/1994 | Rush, III . |
| 5,347,323 | 9/1994 | Wilson . |
| 5,384,604 | 1/1995 | Chang . |
| 5,390,369 | 2/1995 | Tubin . |
| 5,441,695 | 8/1995 | Gladden . |
| 5,536,828 | 7/1996 | Drescher . |
| 5,541,674 | 7/1996 | Jannard . |
| 5,555,038 | 9/1996 | Conway . |
| 5,648,832 | 7/1997 | Houston et al. . |
| 5,689,323 | 11/1997 | Houston et al. . |
| 5,805,261 | 9/1998 | Houston et al. . |

FOREIGN PATENT DOCUMENTS

| | | |
|---|---|---|
| 3-144415 | 6/1991 | Japan . |
| 4-114124 | 4/1992 | Japan . |
| 5-61003 | 3/1993 | Japan . |
| 297472 | 6/1954 | Switzerland . |
| 1765802-A1 | 9/1992 | Switzerland . |
| 512419 | 9/1939 | United Kingdom . |
| 126488 | 4/1971 | United Kingdom . |
| 1299981 | 12/1972 | United Kingdom . |
| 2 278 459 | 11/1994 | United Kingdom . |
| 92/07293 | 4/1992 | WIPO . |

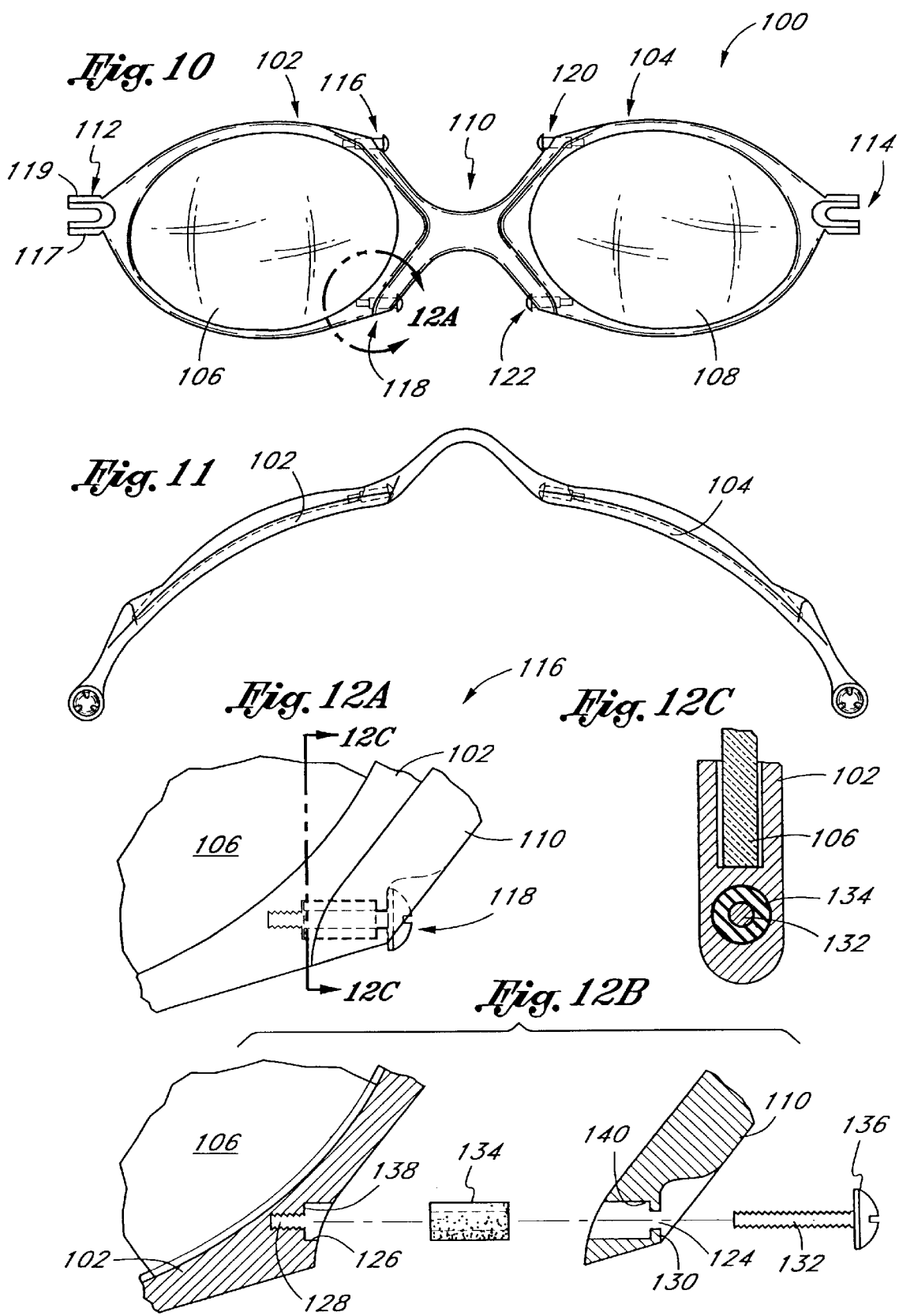

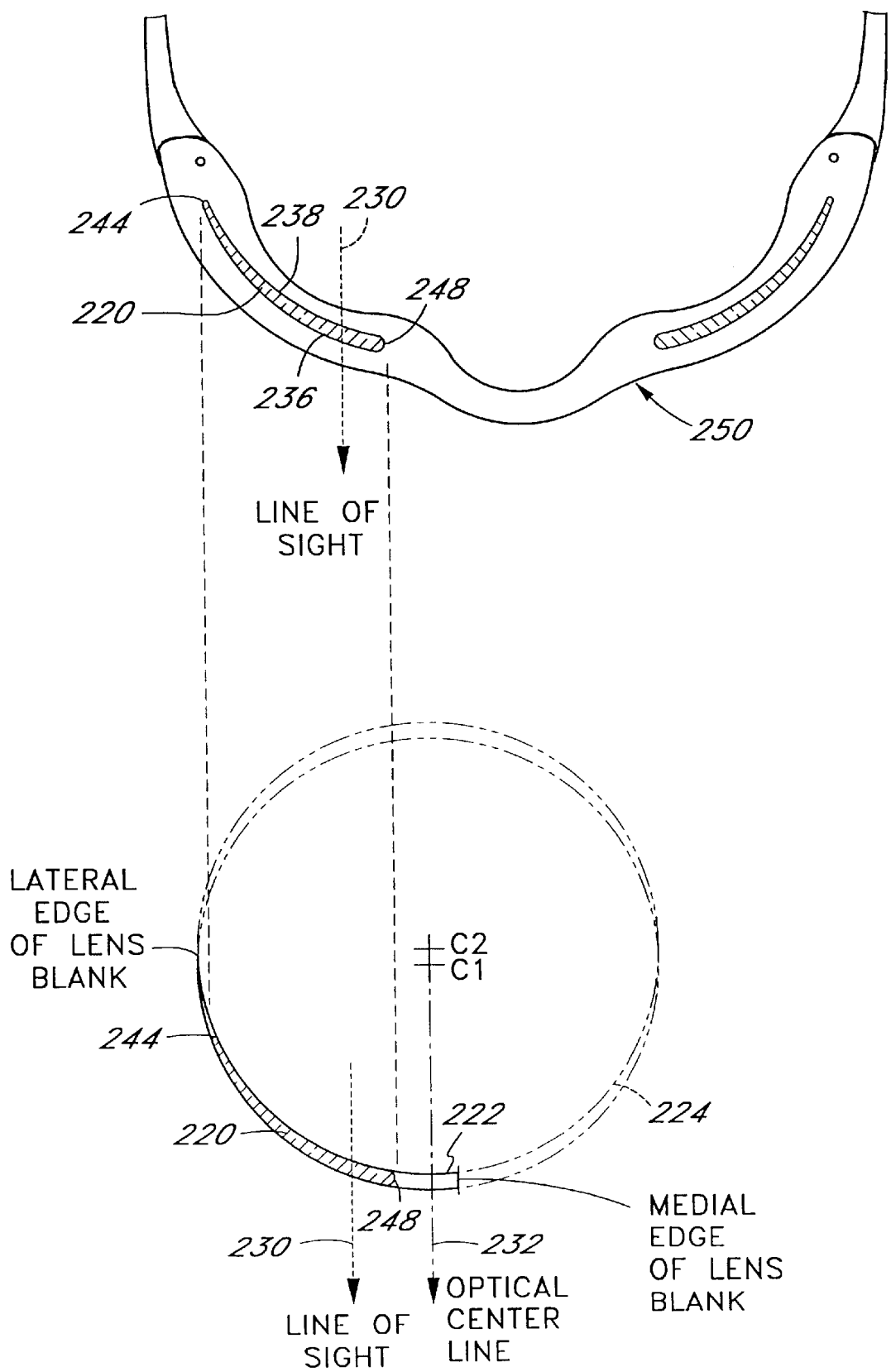

BIASED EYEGLASS FRAMES

This is a continuation application of U.S. patent application Ser. No. 08/780,637, entitled "Dimensionally Stable Eyeglass Components," filed Jan. 8, 1997, now U.S. Pat. No. 5,805,261, which is a continuation-in-part of U.S. patent application Ser. No. 08/681,777, entitled "Articulated Eyeglass Frames," filed Jul. 29, 1996, now U.S. Pat. No. 5,708,489, which is a continuation-in-part of U.S. patent application Ser. No. 08/416,211, entitled "Dimensionally Stable Eyewear," filed Apr. 4, 1995, now U.S. Pat. No. 5,541,674.

BACKGROUND OF THE INVENTION

The present invention relates to multi-component eyeglass frames. More particularly, the present invention relates to dimensionally stable eyewear components in an articulated eyeglass frame.

A wide variety of improvements have been made in recent years in the eyewear field. For example, the unitary cylindrical lens was popularized by the Blades® (Oakley, Inc.) eyewear which incorporated, among others, the technology of U.S. Pat. No. 4,859,048 to Jannard. Toroidal unitary lens geometry having a constant horizontal radius throughout was introduced through a variety of products in the M Frame® line of eyeglasses, also produced by Oakley, Inc. See, e.g., U.S. Pat. No. 4,867,550 to Jannard. Various other improvements in eyewear systems are exemplified in U.S. Pat. Nos. 4,674,851, 4,730,915, 4,824,233, 4,867,550, 5,054,903, 5,137,342, 5,208,614 and 5,249,001, all to Jannard, et al.

The foregoing designs as well as other active sports eyeglasses on the market generally utilize a unitary lens or dual lenses formed from a polymer such as polycarbonate, which is mounted in a polymeric frame. Alternatively, the prior art includes eyeglasses in which glass or polymeric lenses have been mounted in frames formed from thin metal sections such as metal wire.

One continuing objective in the field of high quality eyewear, particularly that intended for use in high speed action sports, is minimizing distortion introduced by the eyewear. Distortion may be introduced by any of a variety of influences, such as poor construction materials for the optical portion of the lens, and inferior polishing and/or molding techniques for the lens. In addition, optical distortion can result from the interaction of the lens with the frame, such as changes in the shape of the lens orbital.

Eyeglass systems which use a polymeric or metal wire frame are susceptible to bending and flexing due to a variety of environmental causes such as impact, storage induced and other external forces, forces resulting from the assembly process of the eyewear, and exposure to sunlight and heat. Flexing of the lens or uncontrolled deviation of the orientation of one lens with respect to the other or with respect to the ear stems can undesirably change the optical characteristics of the eyeglasses, whether the lens is corrective (prescription) or noncorrective.

Thus, there remains a need for a dimensionally stable support structure for eyeglass lenses, suitable for use with corrective and noncorrective lenses in rugged, high durability eyewear. Preferably, the eyewear remains aerodynamically suited for active sports such as high speed bicycle racing, skiing and the like, and weighs no more than necessary to accomplish the foregoing objectives.

SUMMARY OF THE INVENTION

There is provided, in accordance with one aspect of the present invention, an oriented, biased eyeglass frame. The eyeglass frame comprises a left orbital and a right orbital for supporting a left lens and a right lens, respectively. A bridge is connected between the right and left orbitals. A left earstem is connected to the left orbital, and a right earstem is connected to the right orbital.

At least one biased left connector is provided between the left orbital and the bridge, and at least one biased right connector is positioned between the right orbital and the bridge. The right and left connectors permit limited movement of the right orbital with respect to the left orbital upon application of an external force, such as flexing the eyeglasses for mounting on the head of a wearer. The left and right connectors thereafter return the left and right orbitals to a predetermined orientation upon removal of the external force, as a result of the biasing force from the connectors. The eyeglass thus self correct by automatically returning to the pre-determined orientation.

Preferably, the eyeglasses comprise a second left connector and a second right connector. In one embodiment, the left connector comprises a shaft having a first portion connected to the orbital and a second portion connected to the bridge. A resilient material extends alongside at least a portion of the shaft to provide a bias to return the left and right orbitals to the predetermined orientation. In one embodiment, the left and right orbitals comprise a metal, such as titanium. Preferably, the bridge and earstems also comprise titanium. The components of the eyeglass system may be investment cast, injection molded, pressed and scintered, or provided in accordance with other metal-forming techniques.

The left and right orbitals may surround the entire periphery of the left and right lenses, respectively, or may surround only a portion of the periphery of the left and right lenses, respectively.

In accordance with another aspect of the present invention, there is provided an investment cast eyeglass frame. The frame comprises a first orbital, a second orbital, and a bridge connecting the first and second orbitals.

First and second biased connectors are attached to the bridge for maintaining the first and second orbitals in a predetermined orientation with respect to each other. Preferably, the first and second orbitals are movable from the predetermined orientation to a second orientation by pivoting the eyeglass frame at the first and second connectors, and when in the second orientation, the eyeglass frame is biased towards the predetermined orientation.

Preferably, first and second lenses are mounted in the first and second orbitals. Each of the first and second lenses is characterized by an optical centerline. Preferably, in the predetermined orientation, the optical centerline of each lens is maintained substantially parallel to a wearer's predetermined reference line of sight when the eyeglass frame is mounted on the wearer's head in a normal as-worn orientation. In one embodiment, the predetermined reference line of sight is the wearer's theoretical straight-ahead normal line of sight.

Further features and advantages of the present invention will become apparent from the detailed description of preferred embodiments which follows, when considered together with the attached drawings and claims.

BRIEF DESCRIPTION OF THE DRAWINGS

FIG. 10 is a front elevational schematic view of an alternate embodiment of the present invention.

FIG. 11 is a top plan view of the embodiment of FIG. 10.

FIGS. 12A–12C are enlarged views of a biased connector as in FIG. 10.

FIG. 19A illustrates the profile of a properly configured and oriented lens for use in an eyeglass having downward rake, in accordance with a preferred embodiment of the present invention.

FIG. 19B illustrates the profile of a centrally oriented lens with no rake.

FIG. 19C illustrates a lens exhibiting downward rake but which is not configured and oriented to minimize prismatic distortion for the straight ahead line of sight.

FIG. 20 schematically illustrates the projection of the lens horizontal profile from a desired orientation within an eyewear frame to the lens blank, in accordance with a preferred embodiment of the present invention.

DETAILED DESCRIPTION OF THE PREFERRED EMBODIMENTS

Figure 1:
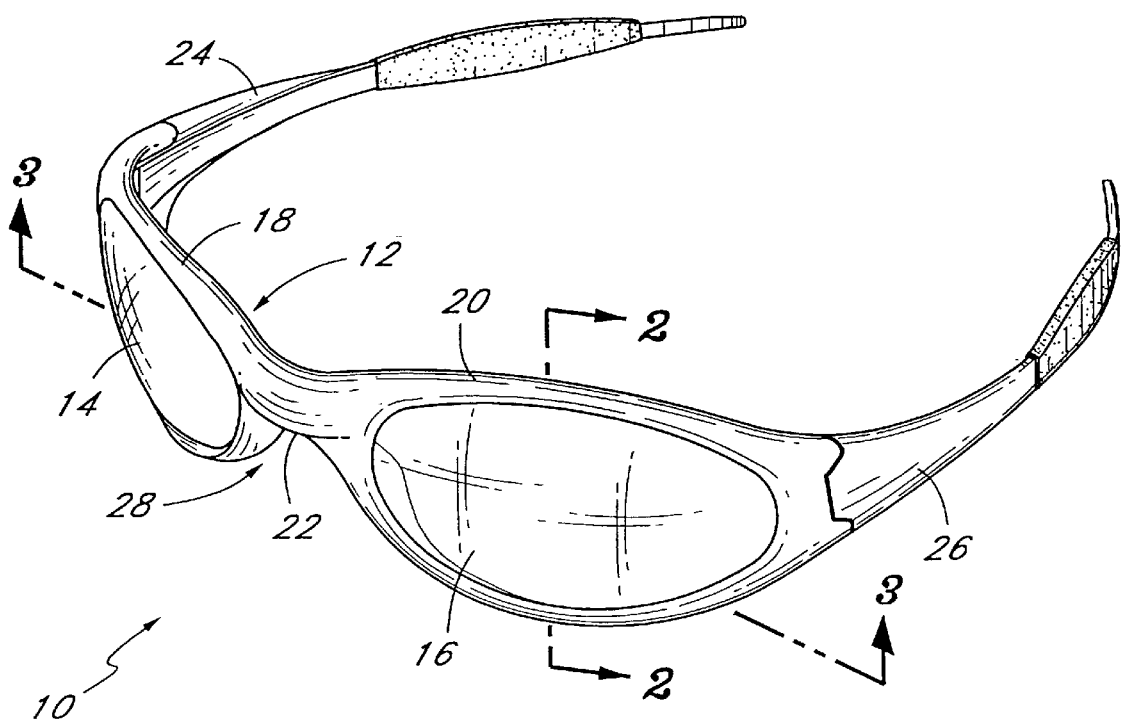
FIG. 1 is a perspective view of an eyeglass having a frame prepared in accordance with the present invention.

Referring to FIG. 1, there is disclosed one embodiment of an eyeglass prepared in accordance with the present invention. The eyeglass 10 generally comprises a frame 12 which, in the illustrated embodiment, supports a pair of lenses 14 and 16. Although the present invention will be described with reference to a dual lens system, it is to be understood that the methods and principles discussed herein are readily applicable to the production of frames for unitary lens eyeglass systems and protective goggle systems as well.

The frame 12 generally comprises a first orbital 18 and a second orbital 20 for supporting the first lens 14 and second lens 16. Although the present invention will be disclosed in the context of a pair of orbitals 18 and 20 which surround the respective lenses, the principles of the present invention also apply to eyeglass systems in which the frame only partially surrounds the lens or lenses, or contacts only one edge or a portion of one edge of the lens or each lens as well.

In the illustrated embodiment, the orbitals 18 and 20 are connected by a bridge portion 22.

The eyeglass 10 is also provided with a pair of generally rearwardly extending earstems 24 and 26 for retaining the eyeglass on the head of the wearer. In addition, an open region 28 is adapted to receive the nose of the wearer, as is understood in the art. Nose region 28 may optionally be provided with a nose piece, either connected to the lens orbitals 18 and 20, or the bridge 22, or directly to the lens(s) depending upon the particular embodiment. Alternatively, the nose piece may be formed by appropriately sculpting the medial edges of the orbitals and lower edge of the bridge, as in the illustrated embodiment.

In accordance with the present invention, at least the orbitals 18 and 20, and optionally the bridge 22, as well as other components of the eyeglass system, are manufactured from a high structural integrity material and preferably through a casting process to optimize structural stability in at least the optical support portion of the final product. The orbitals 18 and 20 can be separately formed and assembled later with a separately manufactured bridge 22, or the orbitals 18, 20 and bridge 22 can be integrally molded or cast as will be appreciated by one of skill in the art in view of the disclosure herein. Casting the eyeglass components directly into the final configuration as disclosed herein desirably eliminates the need to bend metal parts as is done in the prior art methods of making and adjusting metal eyeglass frames.

Earstems 24 and 26 may also be formed through the casting techniques disclosed herein; however, it has been determined by the present inventor that the earstems 24 and 26 are preferably constructed in a manner that permits at least medial and lateral direction flexibility, to enhance the comfort for the wearer and accommodate a variety of head widths. Flexibility of the rearwardly extending ends of earstems 24 and 26 in the desired medial and lateral directions can be accomplished either through the use of flexible construction materials for the earstem as is known in the art, or through the use of relatively rigid earstems in combination with a spring, resilient hinge materials, compressible materials or other techniques which can be devised to impart some flexibility and even a medial bias. Preferably, earstems 24 and 26 are connected directly or indirectly to the orbitals 18 and 20 through the use of hinges. However, nonhinged flexible or inflexible connections may also be used as desired.

Figure 2:
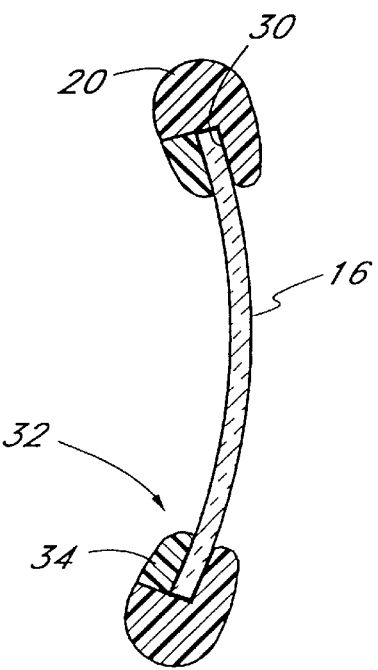
FIG. 2 is a cross-sectional view along the lines 2—2 in FIG. 1.

Referring to FIG. 2, there is disclosed a cross-section through the orbital 20 of the embodiment illustrated in FIG. 1. In this embodiment, the orbital 20 is provided with an annular seat 30 for receiving the lens 16. The annular seat 30 in one embodiment is formed by the sidewall of a channel extending radially outwardly into the orbital 20 for surrounding the edge and a portion of the front and rear surface of the lens 16. In an embodiment having a radially outwardly extending channel for receiving the lens, access to the channel for installing the lens can be provided by bifurcating each orbital along a horizontal, vertical or other axis. The orbital sections can be recombined following insertion of the lens. Alternatively, the seat 30, as illustrated, is formed by the surface of an annular shelf for receiving the lens from the front or rear side of the glasses.

The lens may be retained in the frame in any of a variety of manners. For example, in the illustrated embodiment, a lens retention structure 32 such as a lens retention ring 34 is provided for retaining the lens 16 in the seat 30. The lens retention ring 34 can be secured in position in any of a variety of ways, such as welding, brazing, soldering, adhesives, other metallic bonding techniques, snap fit, threaded engagement, screws, or otherwise as will be understood to those of skill in the art.

As an alternate to a lens retention ring 34, the lens retention structure 32 can be one or more projections extending from the orbital 20 in the direction of the optical zone of the lens, projections on the lens for engaging the orbital, or any of a variety of other structures which will be readily apparent to one of skill in the art in view of the disclosure herein. In one embodiment the lens retention structure 32 is permanently installed at the point of manufacture. Alternatively, the lens retention structure is provided with a snap interfit, screws or other releasable retention feature to permit removal by the wearer such as to permit the wearer to exchange lenses.

The lens can seat directly against the metal seat 30 and lens retention structure 32. Alternatively, a spacer such as a resilient gasket or substantially nonresilient pad can be positioned in between the lens and the seat 30 and/or retention structure 32, to provide a "floating" lens suspension system.

Preferably the frame and optionally the earstems are manufactured through an investment casting technique. One benefit of investment casting is that a high degree of control can be achieved over the design, both structurally and aesthetically.

Figure 3:
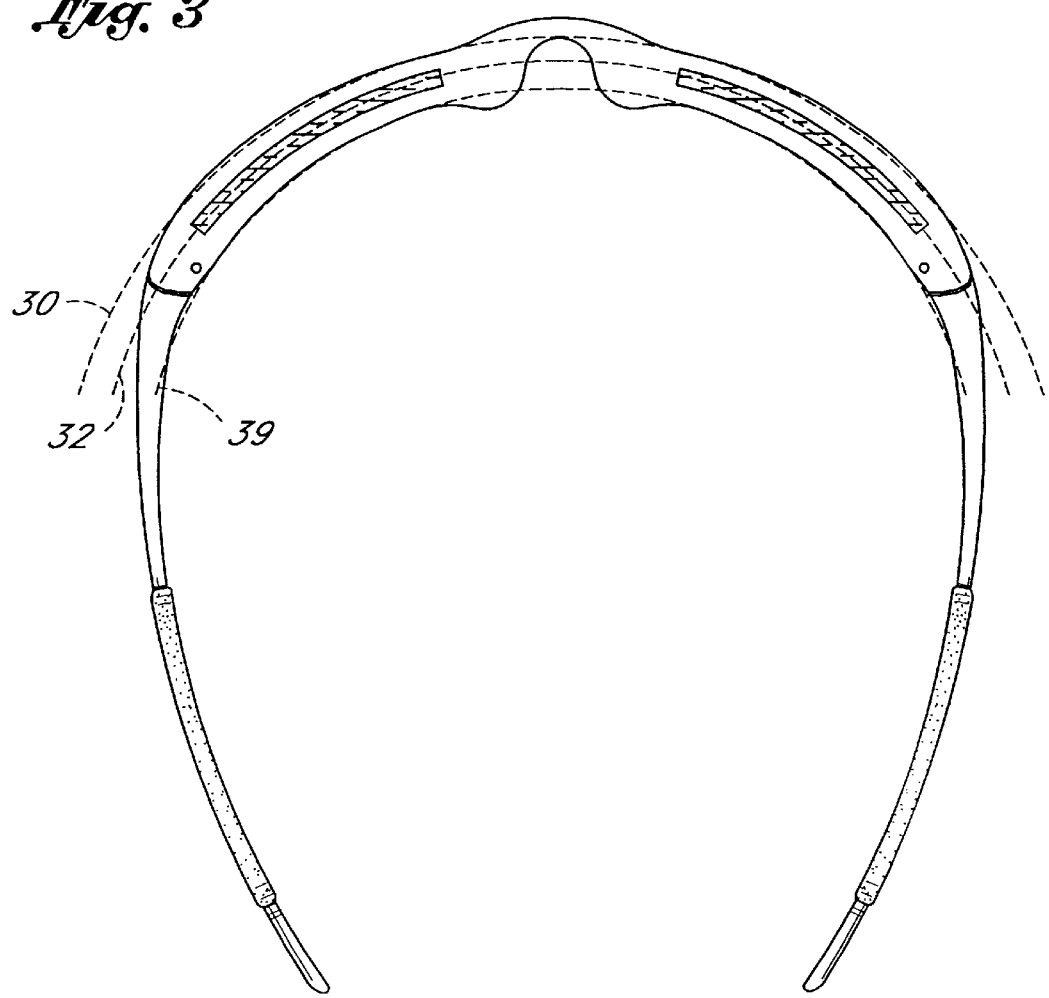
FIG. 3 is a cross-sectional view along the lines 3—3 in FIG. 1.

In one embodiment of the present invention, the surfaces of the lenses or optical zones lie on the surface of a solid geometric shape having a curve of substantially constant radius along what is the horizontal meridian of the eyeglasses. Thus, for example, referring to FIG. 3, the front surface of one embodiment of the eyeglass frame conforms generally to a curve 30 such as a base 4 curve. The lens slot preferably conforms generally to a curve 32 such as a base 6, and the concave surface of the eyeglasses conforms generally to a curve 34 of base 8. Other base curves can be readily used if desired, such as to accommodate either prescription (corrective) lenses or noncorrective lenses.

In a typical dual lens investment cast dimensionally stable eyeglass in accordance with the present invention, the overall arc length of the eyeglasses roughly from hinge to hinge is within the range of from about 5½ inches to about 8.0 inches. The maximum vertical height of the glasses through each of the right and left optical zones is typically within the range of from about ¾ inch to about 2½ inches. The horizontal arc length of each right and left lens in a dual lens system is typically within the range of from about 1½ inches to about 3 inches. The narrowest vertical dimension of the eyeglass at the bridge is generally between about ⅛ inch or ¼ inch and about ¾ inch or greater depending upon materials and design variables.

Referring to the fragmentary cross-section shown in FIG. 4, in a cast titanium embodiment, the cross-sectional dimensions through a portion of the orbital are as follows. The widest top to bottom dimension d1 is from about 1/16 inch to about ¾ inch. The widest front to back dimension d2 is from about ⅛ inch to about ½ inch. The front to back dimension d3 at seat 30 is from about 1/32 inch to about ½ inch. The top to bottom dimension d4 at seat 30 is from about 1/32 inch to about ½ inch.

Figure 4:
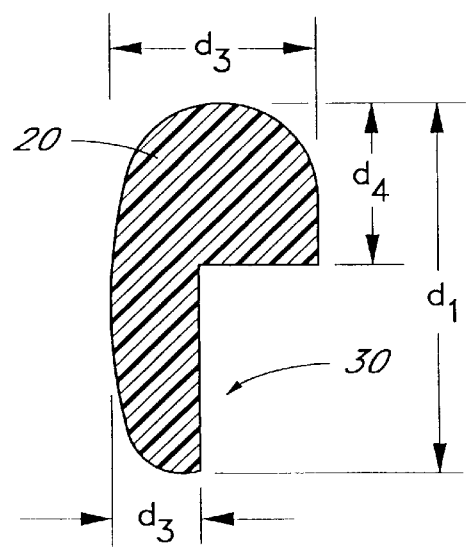
FIG. 4 is a cross-sectional view through the top frame portion of an orbital of the eyeglasses illustrated in FIG. 1.
Figure 5:
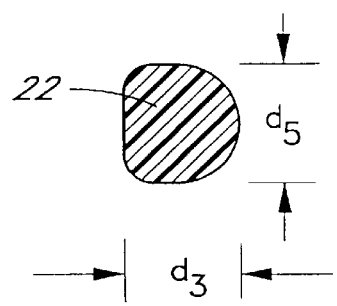
FIG. 5 is a cross-sectional view through the bridge portion of the eyeglasses illustrated in FIG. 1.

In general, no portion of the orbital will have a cross-sectional area that is less than the area achieved by the low end of the dimensions recited above. The bridge 22 generally has an even larger cross-sectional area than the top or bottom sections of the orbital, although it may take a sheet-like form with a relatively thin front-to-back dimension. Thus, referring to FIG. 5, in one embodiment of the invention, the bridge 22 has a height d5 of at least about ⅛ inch and a depth d6 of at least about ⅛ inch. The cross-sectional area at the narrowest portion of the bridge is generally no less than approximately 0.002 square inches. Preferably, the cross-sectional area through the center of the bridge will be at least about 0.015 square inches in a sculpted embodiment, and as much as about 0.06 or more square inches in highly sculpted embodiments.

Where the cross-section through a segment of the orbital is noncircular, as in FIG. 4, the length to diameter ratio can be standardized for comparison by calculating the cross-sectional area and then converting that area to a circular configuration. The diameter of the circle having the same area as the orbital segment is then used in determining the length to diameter radio.

Casting in accordance with the present invention permits relatively larger cross-sectional areas (smaller length to diameter (l:d) ratios) than the prior art wire frame glasses, thereby enhancing stability. l:d ratios may be conveniently reported as an average over a desirable length. This may be useful, for example, where the diameter or cross-sectional area changes significantly along the circumferential arc of the orbital.

For example, l:d ratios may conveniently be determined using a diameter based upon a ½ inch running average along the orbital, one inch average or even ¼ inch average or smaller, indicating that the diameter used in the l:d ratio is the average diameter along the specified length. The l:d ratio can then be expressed using any hypothetical standard length, such as one inch to conveniently compare l:d ratios from one product to another.

Alternatively, cast eyewear frames in accordance with the present invention can be characterized by the minimum cross-sectional dimension. This may be convenient, for example, where irregular cross-sectional configurations are involved. For example, the orbital cross-section may have a generally "c" or "u" configuration, due to the groove for receiving the lens. The minimal cross-sectional dimension may be through either of the legs of the u configuration, or through the bottom of the u configuration. In general, the smallest cross-sectional dimensions through the orbital will be no less than about 0.020 inches average over a distance of no less than about ½ inch. Preferably, the minimum ½ inch running average will be no less than about 0.030 inches, and, in some embodiments, the minimum cross-sectional dimension will be as much as 0.075 inches or greater over a ½ inch length. Portions of the eyeglass orbital will often be greatly in excess of the foregoing minimum dimensions, particularly in the region of the lateral and medial portions of the orbital. By expressing the minimum cross-sectional dimension as an average minimum over a ½ inch length, it is contemplated that the cross-sectional dimension at any specific point could neck down to a smaller cross-sectional dimension than stated, although only for a relatively short distance along the orbital, so that the average cross-sectional dimension over a ½ inch length will still meet the recited minimums.

Relatively smaller cross-sectional dimensions through portions of the eyeglass frame can be utilized with relatively higher rigidity construction materials as will be appreciated in view of the disclosure herein, or with glass lenses. In polymeric lens systems, greater reliance will be placed upon the frame for imparting structural stability. That generally means thicker orbital segments will be desirable.

In a dual lens system, the stability of one lens with respect to the other is strongly influenced by the design and material of the bridge portion 22. In an embodiment that is investment cast from a high titanium content material, the cross-section through the thinnest portion of the bridge will generally be no less than about $\frac{1}{32}$ inch.

Frames such as those disclosed in U.S. Pat. No. 4,611,371 to Fujino et al., which purports to include one particular cast metal eyeglass part, would if it could even be made as described, likely exhibit undesirably high flexibility. The cast part lends no stability to the orbitals, which appear to use wire having about a 10:1 length to diameter ratio, and a cross-sectional area on the order of about 0.8 mm$^2$. In general, in an embodiment of the present invention of the type illustrated in FIG. 1, the portions of the orbitals above and below the lenses will have a length to diameter ratio over any one inch length of no higher than about 7:1 and preferably no higher than about 5:1.

Any of a variety of materials can be utilized to produce a dimensionally stable eyewear system. However, producing an eyeglass having sufficient dimensional stability using certain materials and techniques introduces excessive weight in the finished product, excessive manufacturing costs, or other undesirable circumstance. Thus, the selection of a particular technique or material can be optimized in accordance with the requirements of the product and manufacturer, in view of the disclosure herein.

For example, a variety of steel alloys, such as chrome molybdenum, chromium nickel molybdenum, nickel molybdenum and chrome vanadium steel alloys can be formulated to exhibit good structural properties. Copper, aluminum and silver based alloys can also be used. Preferably, however, lightweight, high strength materials such as titanium a titanium-based alloy or titanium based metal matrix composite such as Ti6Al4V, available from Timet Corp., are utilized in constructing the eyeglass orbitals of the present invention. Alternate titanium alloys, such as commercially pure Grade 1 or Grade 2, Ti3Al2.5V, BT6 alloy, or Ti4Al2V can be used.

The preferred alloy or metal exhibits relatively high strength and stiffness and relatively low weight. Certain copper, aluminum and silver alloys, depending upon temper treatment, have mechanical properties of ultimate strength, initial yield point and modulus of elasticity similar to titanium but differ more significantly in the strength to weight ratio.

In general, any investment castable or moldable metal or metal containing material is a candidate for use in connection with the present invention. Optimizing a particular metal or metal containing material can be done through routine experimentation by one of ordinary skill in the art in view of the disclosure contained herein. In addition to metal choice and dimensional choice, physical properties of the finished cast eyewear can be modified by post investment casting procedures, such as tempering, compaction, or others known in the art.

Depending upon the construction material and the required physical characteristics of the finished product, any of a variety of construction techniques can be utilized to produce dimensionally stable eyewear. For example, modifications of machining techniques, casting and forging methods can be used. Injection molding and press-and-scienter methods known for metal parts in industries other than the eyewear industry can be adapted for use in the present invention. See, for example, U.S. Pat. No. 5,441,695 to Gladden entitled "Process for the Manufacture by Sintering of a Titanium Part and a Decorative Article Made Using a Process of this Type," issued Aug. 15, 1995, and U.S. Pat. No. 5,064,463 to Ciomek, entitled "Feedstock and Process for Metal Injection Molding," issued Nov. 12, 1991, the disclosure of each of which is hereby incorporated in its entirety by reference herein. With respect to casting techniques, metal framed eyewear can be produced utilizing sand castings, permanent mold castings, dye castings or investment casting techniques.

One preferred method for manufacturing the dimensionally stable eyewear or eyewear components in accordance with the present invention is investment casting. Investment casting of dimensionally stable metal eyewear components can be accomplished utilizing a ceramic mold. The mold is formed by pouring a slurry of a material such as a known mold forming refractory material around an orbital or eyeglass pattern, which is maintained in position within a flask as is understood in the investment casting art.

Following a preliminary drying, the mold is baked in an oven to melt the pattern, thereby leaving an empty mold cavity. The investment mold is thereafter fired at a temperature which is appropriate for the metal to be used, and, while still hot, molten metal is poured into the mold and allowed to solidify. The mold is thereafter broken away from the casting to produce the cast orbital, earstem, bridge or eyeglass. The cast component may thereafter be subject to post-casting operations such as sanding, polishing, grinding, sand blasting, or otherwise as desired to produce the finished product.

The present inventor has determined that through the design flexibility available with investment cast metal parts, eyeglass frames can be constructed which maintain a relatively high dimensional stability, yet with the minimal amount of material and weight necessary to achieve that stability. This is due to the opportunity to make complex curves, hollows and other surface contours which can be purely aesthetic, or can allow excess nonstructural material to be eliminated. In addition, the eyeglass can be designed in a manner that simultaneously optimizes the aerodynamic properties of the finished eyeglass, and allows considerable aesthetic design flexibility. Sharp angles and other stress points can be minimized or eliminated, and an overall aesthetic appearance can be maintained.

In addition to the conventional metals and metal alloys discussed above, the objectives of the present invention can be achieved through the use of metal matrix composites, metal-polymer blends and potentially purely polymeric compositions which exhibit sufficient structural integrity to accomplish the desired stabilizing results.

Referring to FIGS. 6 through 9, there is disclosed an articulated eyeglass frame in accordance with the present invention. Although the embodiment discussed herein is a seven-piece system, the inventive concepts can readily be incorporated into eyeglass systems which have fewer or more components as will be apparent to those of skill in the art in view of the disclosure herein. For example, a five-piece system is disclosed in FIGS. 10–14, infra. In addition, all of the dimensions discussed in connection with previous embodiments also apply to the articulated embodiments with exceptions that will be apparent to those of skill in the art.

Figure 6:
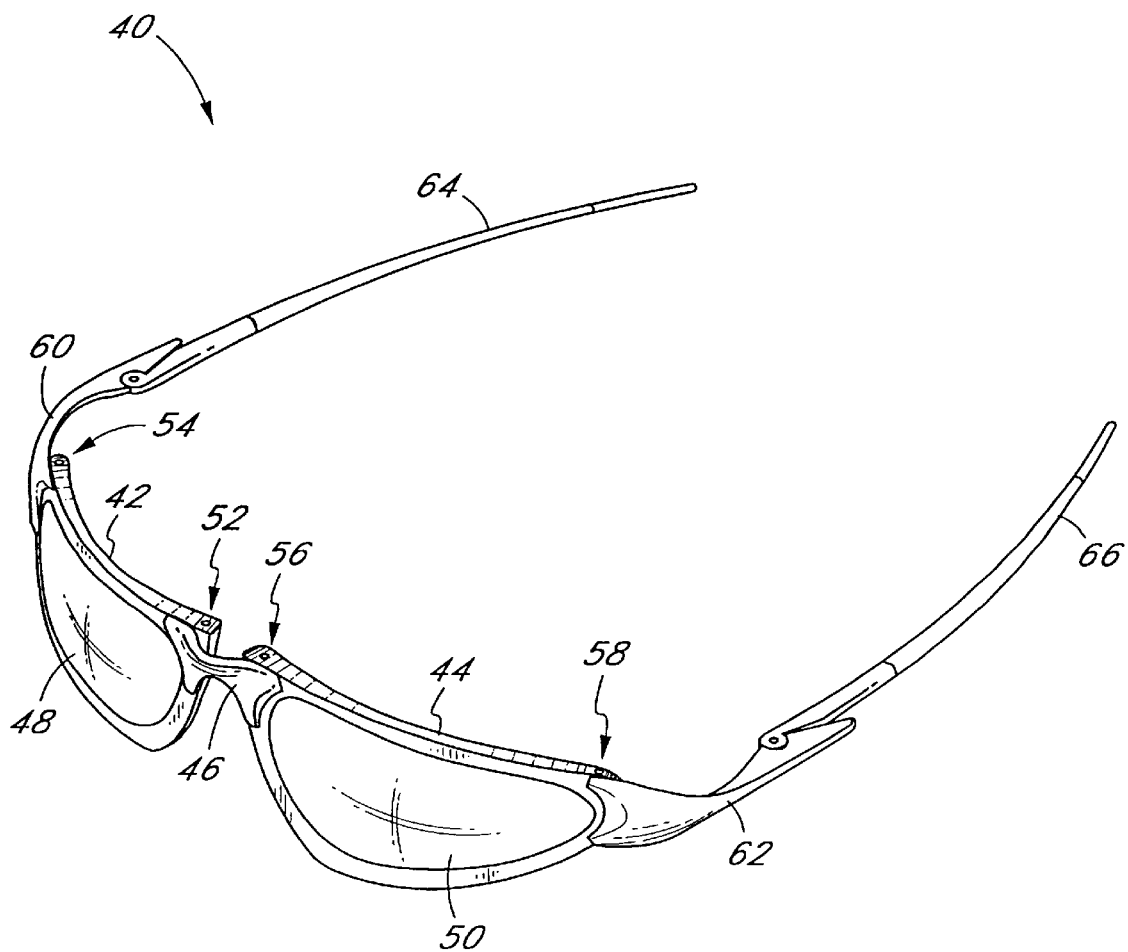
FIG. 6 is a perspective view of an articulated eyeglass frame in accordance with the present invention.

Referring to FIG. 6, there is disclosed an eyeglass 40 which comprises a first orbital 42 and a second orbital 44. First orbital 42 and second orbital 44 are connected to each other by way of a bridge 46.

The first orbital 42 supports a first lens 48, and the second orbital 44 supports a second lens 50. First orbital 42 may be characterized as having a medial section 52 and a lateral section 54. Similarly, second orbital 44 may be characterized as having a medial section 56 and a lateral section 58.

A first link 60 is connected to the lateral section 54 of first orbital 42. A second link 62 is connected to the lateral section 58 of second orbital 44. In the illustrated embodiment, the first link 60 and second link 62 extend generally rearwardly from the first and second orbitals 42 and 44.

A first earstem 64 is connected to first link 60 and a second earstem 66 is connected to second link 62. As illustrated, first and second earstems 64 and 66 extend generally rearwardly from the first and second links 60 and 62.

In one embodiment of the invention, each of the bridge 46, the first and second orbitals 42 and 44, the first and second links 60 and 62, and the first and second earstems 64 and 66 are separately formed. Each of these components is then connected together to produce the eyeglass system illustrated in FIG. 6. Alternatively, the bridge 46 can be formed integrally with one or the other or both of orbital 42 and 44. As a further alternative, the separate bridge 46 can be eliminated, such that first orbital 42 and second orbital 44 are pivotably or rigidly connected directly together.

First link 60 and second link 62 may in an alternate embodiment be deleted, such that first earstem 64 and second earstem 66 connect directly to first orbital 42 and second orbital 44, respectively. Additional linkages may also be inserted, and pivotably or rigidly connected into place.

Figure 7:
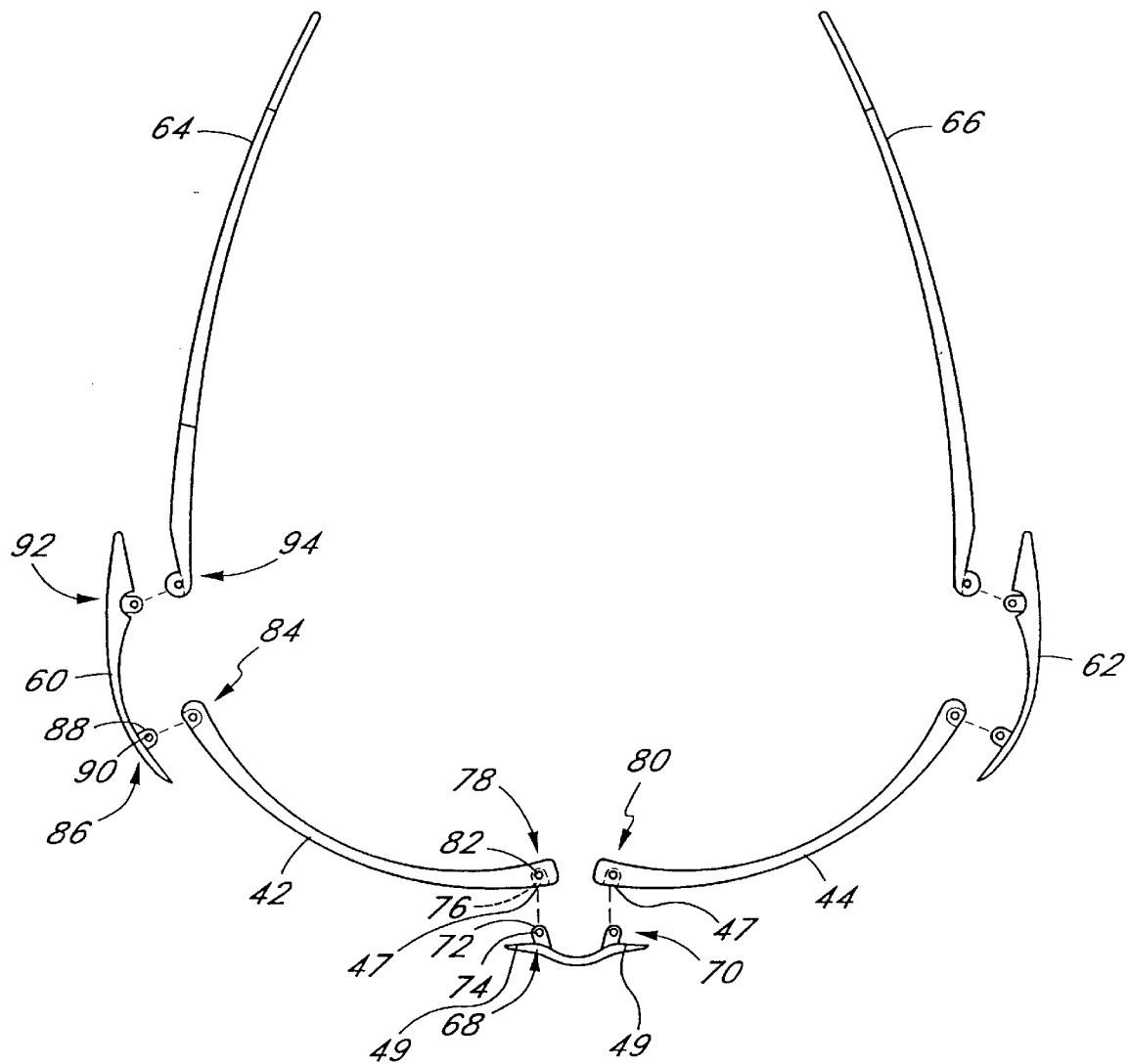
FIG. 7 is an exploded top plan view of the eyeglass frame of FIG. 6.

Referring to FIG. 7, the individual parts of a seven-component system are illustrated. The bridge 46 is provided with a first bridge connector 68 and a second bridge connector 70. As used herein, connector refers to one or more parts of a complementary two or more component connection system. For example, in the illustrated embodiment, first bridge connector 68 comprises a rearwardly extending flange 72 having an aperture 74 extending therethrough. The flange 72 is adapted to fit within a recess 76 in the medial section 52 of the first orbital 42. An aperture 82 extends through the recess 76 to form a first medial connector 78. The aperture 74 is positioned to coaxially align with the aperture 82 when flange 72 is positioned within recess 76. A pin, screw, or other structure may then be placed through aperture 74 and aperture 82 to pivotally link the bridge 46 with the first orbital 42.

Alternatively, the first and second bridge connectors 68, 70 may be located on the orbitals 42, 44 respectively. In this embodiment, the bridge 46 would have complimentary connector structure such as apertures as will be understood by those of skill in the art. Similarly, the components of any of the other disclosed connectors may be reversed as will be understood by those of skill in the art.

As will be understood by those of skill in the art in view of the disclosure herein, the foregoing cooperation between first bridge connector 68 and first medial connector 78 is only one example of a wide variety of potential connector structures. For example, two or more generally parallel flanges such as flange 72 may be provided on the bridge 46. Alternatively, a structure similar to flange 72 can be provided on the first orbital 42, to cooperate with complementary surface structures on bridge 46 such as an aperture or one or more complementary flanges such as 72.

Interlocking hinge-type structures, snap-fit structures, screws, thermal bonding, adhesives, and any of a variety of other techniques can be utilized to secure the components together. However, the preferred embodiment of the invention utilizes complementary surfaces structures which can be connected such as by a pin to produce at least some range of pivotal motion between the bridge 46 and the orbital 42. All of the connections in the articulated eyeglass frames disclosed herein can be made such that they can be disconnected by the user; such as to permit the user to customize the product with interchangeable component parts.

Bridge 46 is provided with a similar second bridge connector 70, for pivotably connecting to a complementary surface structure in the form of second medial connector 80 on the medial section 56 of second orbital 44. Preferably, the complementary surface structures utilized to construct the connector between the bridge 46 and first orbital 42 will be similar to that utilized to connect the bridge 46 to the second orbital 44.

The lateral section 54 of first orbital 42 is provided with a first lateral connector 84. First lateral connector 84 cooperates with a front segment connector 86 on link 60. In the illustrated embodiment, the front segment connector 86 comprises a flange 88 having a transverse aperture 90 extending therethrough. The first lateral connector 84 on first orbital 42 comprises an aperture 91 adapted to be coaxially aligned with the aperture 90 when the first link 60 is mounted to the first orbital 42. As has been discussed, a pin or other structure (not illustrated) is thereafter positioned through apertures 90 and 91, to connect the first link 60 to the first orbital 42.

The first link 60 is further provided with a rear connector 92 such as an aperture 93 which may intersect a recess (not illustrated) as will be understood by those of skill in the art. The first earstem 64 is provided with an earstem connector 94 which, in the illustrated embodiment, comprises an aperture 95 adapted to be coaxially aligned with the aperture 93 in the installed position. A pin may then be utilized to hold the components together.

The corresponding connections between the second orbital 44, second link 62 and second earstem 66 are preferably mirror images of the description above, and will not be further detailed herein.

Preferably, the first eyeglass orbital 42 and second orbital 44 are constructed from a substantially dimensionally stable material. In the preferred embodiment, the first orbital 42 and second orbital 44 comprise a metal, such as titanium or a titanium-containing alloy. The titanium or titanium alloy orbitals 42 and 44 are preferably formed through an investment casting operation as has been discussed herein.

In one embodiment of the invention each of the bridge 46, first orbital 42, second orbital 44, first link 60, second link 62, and first earstem 64 and second earstem 66 are all investment cast from a titanium or titanium alloy. However any one or more of the foregoing components can optionally be constructed from more conventional materials such as metal wire or plastic.

One advantage of investment cast titanium components is the ability to minimize torsional distortion through the eyeglass system. The eyeglass system of the present invention maintains a substantially constant orientation in the horizontal plane, throughout its various ranges of motion. This feature is facilitated by the relative rigidity of the metal components, and also through the use of the generally planar flange-type connectors, or other connectors which permit pivoting, where desired, but minimize rotation of one component with respect to the other about a horizontal axis.

In a titanium embodiment, or other metal embodiment, whether or not investment cast, the components in accordance with the present invention are generally more rigid than prior art polymeric eyeglass frame components. Some degree of flexibility is generally required in an eyeglass frame, particularly in the horizontal plane, to accommodate different head widths and also to provide retention on the head of the wearer with an optimum comfort level. For this purpose, some or all of the various connectors in the eyeglass system preferably provide some range of motion between adjacent components. For example, each of the first and second orbitals 42 is pivotable through a range which does not exceed about ±15° with respect to the bridge 46. Preferably, the eyeglass orbitals 42 and 44 are pivotable through a range of no more than about ±10°. More preferably, each of the eyeglass orbitals 42 and 44 are pivotable through a range of no more than about 5° with respect to the bridge 46. Embodiments can also readily be constructed having a pivotable range of ±2° or 1° or less.

The range of motion can be limited in any of a variety of ways, such as by the contour on an abutment surface 47 adapted to contact an opposing abutment surface 49 when the first bridge connector 68 is connected to the first medial connector 78. By adjusting the spacing between the first abutment 47 and second abutment 49, alone or as well as the contour of the complementary surfaces, the range of pivotal motion between bridge 46 and orbital 42 can be controlled. Similar structural configurations can be utilized throughout each of the various connections in the eyeglass system.

Within a particular range of motion for a particular connection, it may be desirable to dampen the pivotable motion, or to resiliently bias the joint to a particular orientation or in a particular direction. This may be accomplished, for example, by placing a spring or resilient pad in-between the opposing surfaces 47 and 49, or each of the other similarly opposing joint surfaces throughout the eyeglass frame, such as at the connection of the earstem. The resilient pad may extend throughout only a portion or all of the complementary abutment surfaces 47 or 49. In one embodiment, the resilient pad is in the form of an O-ring which is positioned around the flange 72 such that it lies in the plane which extends through the space between surfaces 47 and 49 in the assembled configuration.

By adjusting the durometer and/or thickness of the damper pad, together with the relative compression in the mounted configuration, any of a wide variety of biasing forces and ranges of motion can be achieved. Silicone, polyurethane, and any of a variety of other elastomeric or resilient materials can be used. Springs, spring wire, or resilient metal strips can also be used to bias joints towards the predetermined orientation.

The earstem is preferably foldable to a collapsed configuration such as for storage of the eyeglasses 40 as is known in the art. In general, the primary folding of the earstem can be accomplished at the earstem connector 94 or at the first lateral connector 84 on orbital 42. In one embodiment of the invention, folding of the earstem can be accomplished through pivoting at both the first lateral connector 84 and earstem connector 94. Preferably, however, the first lateral connector 84 provides only a relatively limited range of motion, and the primary folding of the earstem 64 is accomplished at the earstem connector 94. Thus, earstem connector 94 preferably permits the earstem 64 to be pivotably rotated with respect to first link 60 throughout a range of at least about 90°. The pivotable connection between the first orbital 42 and first link 62 is preferably limited to no more than about ±5°. More preferably, the range of motion between the first orbital 42 and first link 60 is limited to no more than about ±2.5°.

A separate nosepiece can additionally be added to the eyeglass 40. Alternatively, the lower surface of the bridge 46 can be configured to cooperate with the medial edges of first orbital 42 and second orbital 44 so that the orbitals or the orbitals and the bridge rest on the nose of the wearer without the need for additional nosepiece components.

Each of the first and second orbitals 42 and 44 are illustrated as completely surrounding the respective first and second lenses 48 and 50. Alternatively, the first and second orbitals 42 and 44 can be configured to surround only a portion of the first and second lenses 48 and 50 without departing from the spirit of the present invention. The lens 48 may be retained within the orbital 42 in any of a variety of manners that may be appropriate for the construction material of the lens 48 and orbital 42. For example, in an embodiment having a polycarbonate lens and an investment cast titanium orbital, the lens is preferably advanced into an annular seat in the orbital in a manner similar to that described in connection with FIGS. 2 and 4. One or more retention structures, such as an annular snap-fit ring may then be press-fit into the orbital to retain the lens in position. See FIG. 2. Alternatively, the lens may be sandwiched between a front and a rear component of the eyeglass orbital, which are configured to combine to produce the finished orbital. Gaskets or other padding structures may also be incorporated to provide a spacer between the material of the lens 48 and the material of the orbital 42. Lens retention structures may be held in place by friction fit, screws, welds, adhesives or any of a variety of ways depending upon desired assembly and durability characteristics.

Figure 8:
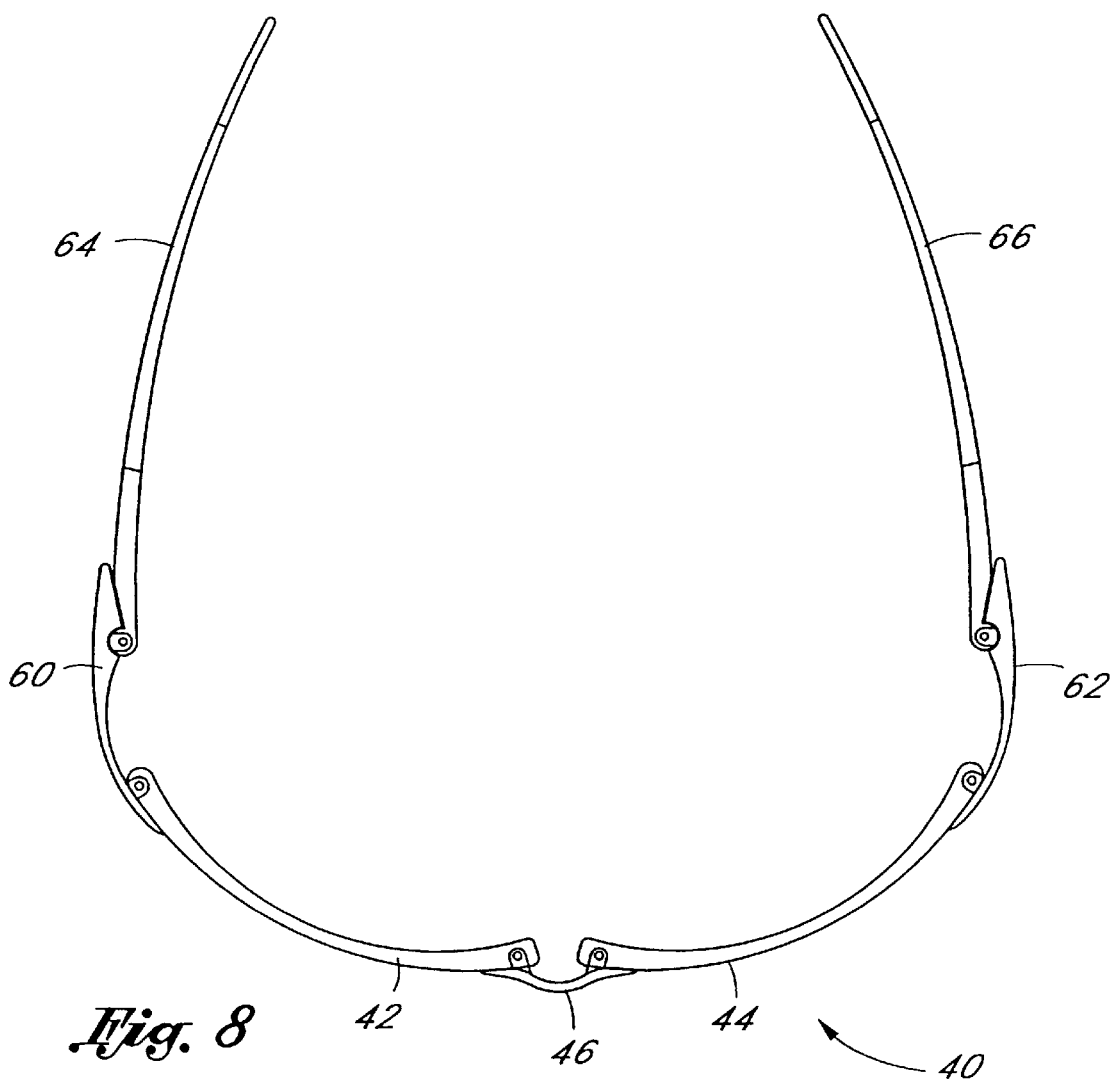
FIG. 8 is a top plan view of the articulated eyeglass frame of FIG. 6.
Figure 9:
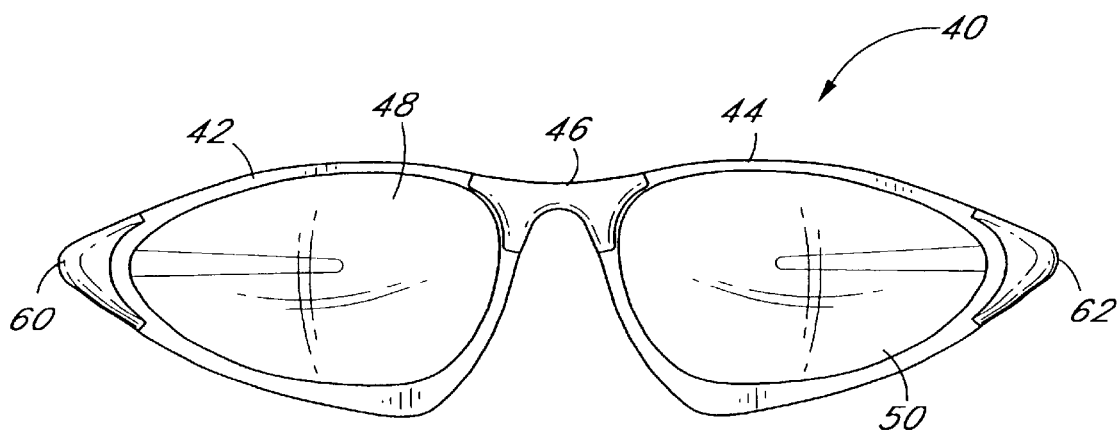
FIG. 9 is a front elevational view of the articulated eyeglass frame of FIG. 6.

FIG. 8 illustrates a top plan view of the articulated eyeglass frame 40 of FIG. 6. FIG. 9 illustrates a front elevational view of the articulated eyeglass frame 40 of FIG. 6.

Referring to FIGS. 10–14, there is disclosed a further embodiment of the controllably pivotable articulated eyeglasses of the present invention. Referring to FIG. 10, an articulated eyeglass orbital system 100 is provided with a first orbital 102 and a second orbital 104. First orbital 102 is configured to receive a first lens 106, and second orbital 104 is configured to receive a second lens 108. Preferably, each of the first and second orbitals 102, 104 is provided with a radially inwardly facing channel or other structures as has been discussed for receiving the respective lens.

In the illustrated embodiment, each of the first orbital 102 and second orbital 104 completely surrounds the lens 106, 108, respectively. However, as discussed infra orbitals imparting dimensional stability to the lens can also be readily configured to surround less than the entire eyeglass lens.

First orbital 102 and second orbital 104 are connected by way of a bridge 110. Preferably, the bridge 110 permits some degree of controllable pivoting of the first orbital 102 with respect to second orbital 104, as will be discussed, without requiring the actual eyeglass components to flex.

First orbital 102 is further provided with a first pivotable connector 112. Second orbital 104 is additionally provided with a second pivotable connector 114. Pivotable connectors 112 and 114 are adapted to pivotably receive an earstem 113, 115 (see FIG. 14) as will be understood in the art.

In general, pivotable connector 112 comprises one or two or more generally horizontally extending or inclined flanges 117, 119 for lying adjacent one or more corresponding flanges 121 on the earstem 113. In the illustrated embodiment, earstem flange 121 is positioned between orbital flanges 117, 119 and a pin 123 is positioned within an aperture extending transversely therethrough. Pin 123 can comprise any of a variety of suitable fulcrum structures, such as threaded or unthreaded shafts. Alternatively, complementary projections and recesses or other pivotable structures can be used.

Preferably, the fulcrum is spaced apart from the end of the earstem, as illustrated to limit the range of motion. Thus forwardmost edge of the aperture extending through flange 121 is preferably spaced rearwardly from the forward end 125 of the earstem 113. The distance between the forward end 125 and aperture in flange 121 is preferably at least about 1/16", more preferably more than about 1/8", and optimally at least about 1/4" or 1/2", to provide an adequate stopping surface 127 for contacting the front or side of the orbital 102 thereby limiting lateral motion of the earstem 113. Any of a variety of dampers may be positioned between the stop 127 and the corresponding contact surface, such as polyurethane or silicone pads, gaskets, O-rings, or the like to dampen the lateral limit of travel of the earstem 113. In one embodiment, the damper (not illustrated) is removably attached to the earstem 113 and/or corresponding stop surface on the orbital 102. A selection of dampers ranging from approximately 1/64" to approximately 1/4" thick or larger in 1/16", 1/32", 1/8" or other regular increments may be provided, having the same or differing durometers. By selecting the thickness of the damper, and mounting it at the stop surface 127 or complementary surface on the orbital, the user may thus customize the maximum lateral separation between the rearward ends of earstems 113, 115, as will be apparent to those of skill in the art in view of the disclosure herein.

In addition to or as an alternate to the damper, an adjustable limit may be provided to permit continuous adjustment of the lateral limit of motion of each ear stem 113 and 115. In one embodiment, the adjustable limit comprises a threaded screw rotatably positioned within a threaded bore extending through the lateral zone of the orbital 102. The screw is aligned such that a lateral end comes into contact with stop surface 127 when the earstem 113 is advanced to its most lateral position. Adjustment of the screw in the lateral direction thus limits the lateral range of motion of the rearward end of earstem 113 as will be apparent to those of skill in the art. The screw may be provided with an elastomeric tip for contacting surface 127, or surface 127 may be provided with a recessed elastomeric pad for coming into contact with the lateral end of the screw. Alternatively, the adjustment screw may extend laterally through the forward end 125 of the earstem 113 in the medial direction for contacting the complementary surface on the lateral side of the orbital 102. Advancing the screw in the medial direction in this embodiment will limit the lateral range of motion of the rearward end of earstem 113.

First orbital 102 is movably connected to the bridge 110 by way of a bridge connector 116. Preferably, a second bridge connector 118 is also provided, to enhance control over the axis of flexibility of the eyeglass orbitals. In general, the first orbital 102 is pivotable about an axis 129 (see FIG. 13) extending through bridge connector 116 and bridge connector 118. The axis may be parallel to the theoretical vertical in the as-worn orientation, or may be inclined laterally in the downward direction with respect to the vertical in the as worn orientation.

Referring to FIG. 12, there is illustrated an enlarged exploded view of one embodiment of bridge connector 116. In general, bridge connector 16, either by itself or in combination with at least one additional bridge connector 118 operate to provide an axis of rotation of the first orbital 102 with respect to the bridge 110. Bridge connector 116 thus provides a limited movement of the first orbital 102 with respect to the bridge 110 substantially without any flexibility on the part of the first orbital 102 or bridge 110. Thus, the use of a bridge connector 116 as described herein is particularly desirable in the case of eyeglass components made from rigid materials.

In the illustrated embodiment, bridge connector 116 comprises a bore 124 which extends through an overlaying portion of the bridge 110 and the adjacent portion of the orbital 102. The bore 124 is further provided with a counterbore 126 extending in opposite directions from the interface between the bridge 110 and the first orbital 102. The diameter of the counterbore is greater than the diameter of the bore 124, to provide a first and second annular shoulder 138, 140 at each end of the counterbore 126, as will be discussed.

The bore 124 continues into the first orbital 102 beyond the end of the counterbore 126, and into a snap fit or threaded portion 128. The opposite end of the counterbore 126 is provided with a radially inwardly extending wall to provide a stop 130 (on the opposite side of shoulder 140) for reasons which will be apparent. When assembled, a pin such as a partially or fully threaded screw 132 extends through the bore 124 and engages the thread 128. A conventional head 136 or other stop structure engages the stop 130 on bridge 110, to retain it against separation from the first orbital 102.

Due to the space surrounding the threaded shaft 132 in the area of the counterbore 126, and a moveable fit between the shaft and entrance to bore 124, if the head 136 is drawn only loosely against the stop 130, the bridge 110 is permitted a controllable degree of motion with respect to the first orbital 102. The depth of the threaded bore 128 can be coordinated with the length of the threaded shaft 132 and other components so that the threaded shaft 132 bottoms out or is otherwise prevented from tightening the bridge 110 too securely against the first orbital 102 to permit motion.

Preferably, a tubular sleeve 134 is positioned within the counterbore 126. The sleeve 134 has a central aperture extending therethrough, for concentrically receiving the threaded shaft 132. Sleeve 134 preferably comprises a relatively resilient material, such as silicone, polyurethane, or any of a variety of materials which will be apparent to those of skill in the art in view of the disclosure herein. Provision of the resilient sleeve 134 provides a biasing force to reset the position of the first orbital 102 into a predetermined orientation with respect to the bridge 110. The first orbital 102 may thus be bent slightly with respect to the bridge 110 by flexing at the bridge connector 116, but such flexing causes a compression of the resilient sleeve 134. The bridge connector 116 is thus biased, such that it seeks to return to its original, predetermined orientation. Providing both a first bridge connector 116 and second bridge connector 118, as illustrated, permits flexing of the first orbital 102 with respect to the bridge 110 along a predetermined axis, throughout a predetermined range of flex, and permits the system to return to its predetermined orientation due to the biasing force imparted by the bridge connector. Similar connectors may also be constructed at bridge connector 120 and bridge connector 122.

In the illustrated embodiment, the threaded shaft 132 comprises a threaded screw having a diameter of about 0.073 inches. The elastomeric sleeve 134 comprises a silicone gasket having an outside diameter of about 0.156 inches, and an inside diameter of about 1/16 of an inch. The axial length of the sleeve 134 along the axis of threaded shaft 132 is on the order of about 1/4 of an inch. Any of a wide variety of bridge connectors 116 can be utilized, as will be apparent to those of ordinary skill in the art in view of the disclosure herein. In general, the bridge connector 116 preferably relies upon compression of a resilient material to provide a return bias to reset the orientation of the articulated eyeglass frame into a predetermined orientation following flexing.

In the illustrated embodiment, each of the threaded shafts 132 extends in a generally horizontal or lateral direction. The orientation of the threaded shaft 132 can be modified such that it extends in a generally vertical direction with respect to a front elevational view of the articulated eyeglass orbital system 100, or any of a wide variety of angular orientations therebetween.

Figure 14:
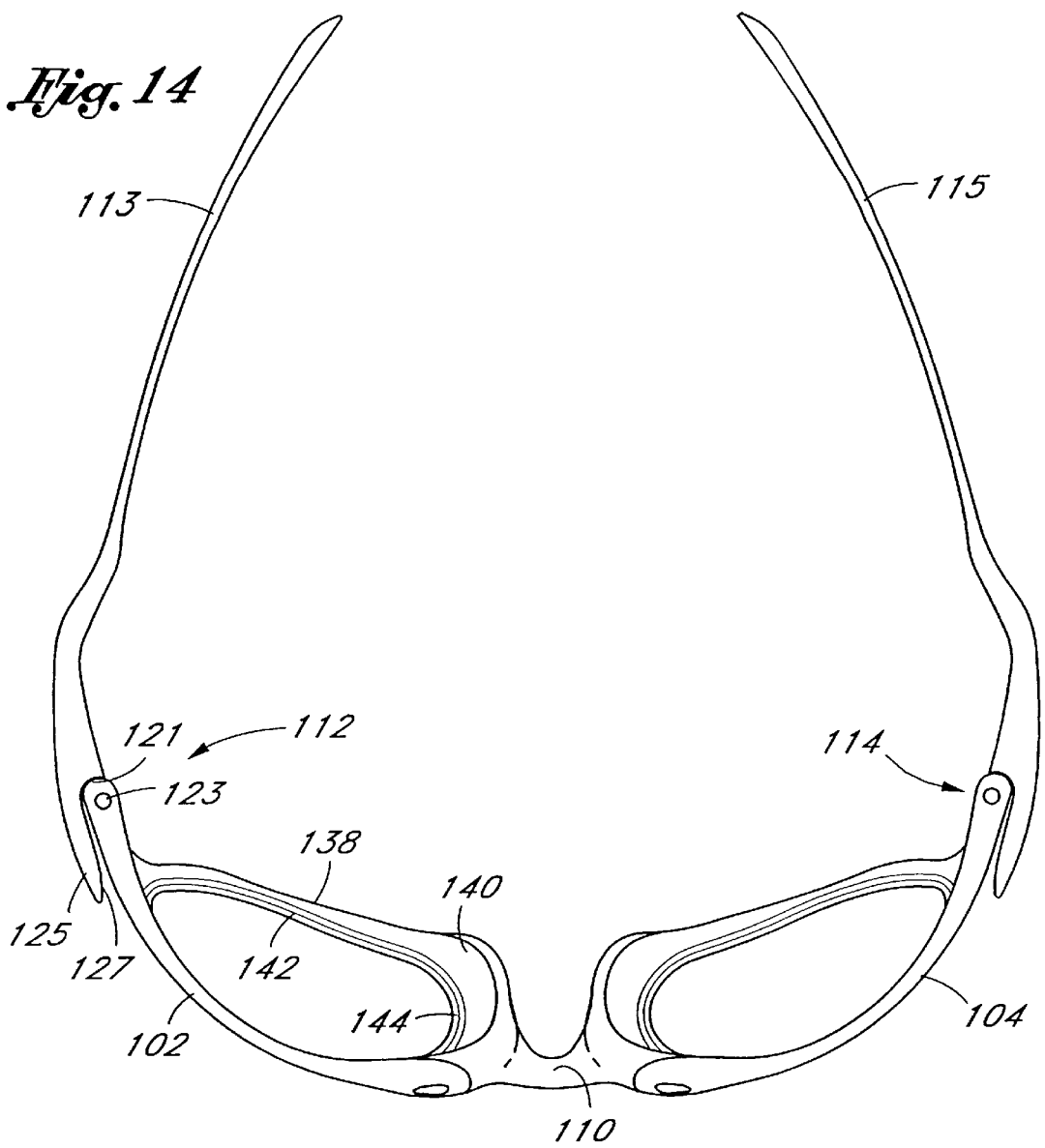
FIG. 14 is a top plan view of the embodiment illustrated in FIG. 13.
Figure 13:
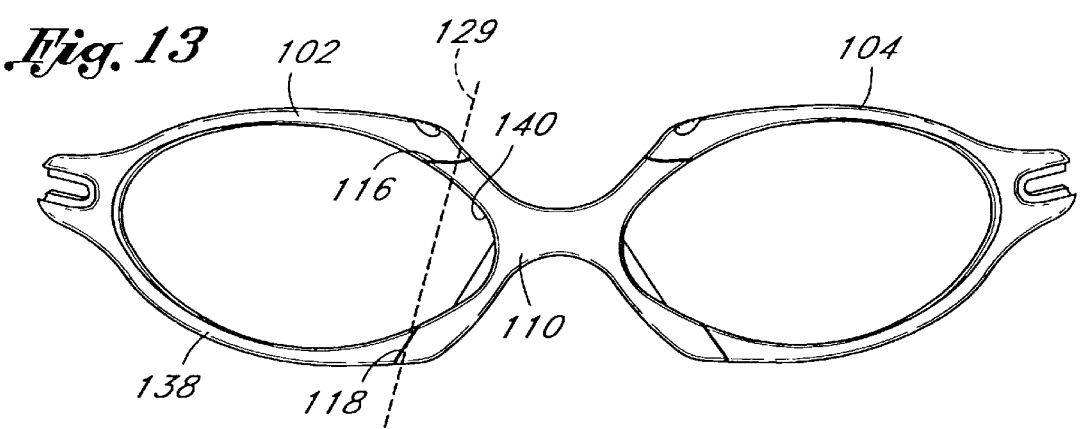
FIG. 13 is a front elevational view of an alternate embodiment of the eyeglass frames in accordance with the present invention.

Referring to the embodiment illustrated in FIG. 13 and 14, the orbital 102 is bifurcated into a first component 138 and a second component 140. In this embodiment, first component 138 and second component 140 are articulated or pivotably connected to one another such as through connectors 116 and 118 as previously described. Thus, the first orbital component 138 surrounds less than the entire periphery of a lens, and the remainder of the lens is surrounded by the second component 140. In essence, the bridge pivot point has been moved from the position of previous embodiments on the medial side of the lens to a position between the medial and lateral edges of the lens.

For the purpose of retaining a lens, the first orbital component 138 is provided with a radially inwardly extending channel 142 as is known from prior embodiments. Channel 142 is preferably dimensioned to closely fit the lens (not illustrated) to minimize motion thereof, as well as to retain the lens in its as mounted geometry. The lens may be seated directly in the channel 142, or surrounded by a gasket or other material between the material of the orbital 138 and the lens as has been discussed.

In the articulated embodiment of FIGS. 13 and 14, the second orbital component 140 is provided with a lens receiving channel 144. The front to back width of the channel 144 is greater than the width of the channel 142, to accommodate forward and backward motion of the medial edge of the lens therein. Thus, as the orbital component 138 pivots about connectors 116 and 118 with respect to the orbital component 140, the medial edge of the lens (not illustrated) must advance in a forward or rearward direction within the lens channel 144. The front to rear width of the lens channel 144 is thus selected based upon the range of motion of orbital component 138 with respect to orbital component 140. In general, the front to back width of the channel 144 will be at least about 0.75 mm, and preferably within the range of from about 1 mm to about 3 mm wide.

Alternatively, the lens receiving channel 144 may be eliminated. In this embodiment, sufficient clearance is provided between the medial edge of the lens and the orbital to permit movement of the lens as described.

In the illustrated embodiment, the medial orbital component 140 is integrally formed with the bridge 110. The medial component of orbital 140 may alternatively be separately formed, and connected to a central bridge component. The medial component of the orbital 140 in the illustrated embodiment is thus also integrally formed with the nose piece. In this embodiment, the nose piece is formed as a sculpted portion of the bridge 110 and orbitals as illustrated. Generally, the bridge 110 and medial portion 140 will extend rearwardly to provide a nose contacting surface adjacent the nose opening as illustrated. Although the articulated eyeglass orbital of FIGS. 13 and 14 has been described above in terms of a single lens, the eyeglass is preferably symmetrical on either side of the bridge 110 and the description therefore applies equally to the opposite lens.

In addition, all though the foregoing embodiments have been described in terms of dual lens eyeglass systems, unitary lens eyeglass systems can also readily incorporate technology of the present invention. For example, an upper frame for retaining a unitary lens, and/or the earstems for pivotably connecting to the upper frame can be formed from a substantially dimensionally stable material as disclosed herein. In one unitary lens embodiment, an arcuate unitary upper frame is provided with an upwardly extending slot on the lower surface thereof for receiving a unitary lens. The upper frame is provided with pivotable connectors at its lateral edges for pivotable receiving a first and second earstem.

The pivot points between the orbitals and the bridge, and optionally at the earstems are preferably biased in the direction of a predetermined orientation. Preferably, the bridge pivots are provided with a stronger biasing force than the earstem hinges to differentially seek to optimize the optical orientation before optimizing the fit.

Biasing may be accomplished in any of a variety of ways, depending upon the structure of the joints. For example, in addition to the use of compressible pads or other materials as discussed above, elastic bands or strips which exert a pulling force may be used. Elastic bands or rings can be looped around retention pegs or apertures on complementary sides of the joint as will be apparent from the disclosure herein.

Alternative sources of biasing force such as coil springs, leaf springs, spring wire, strips or the like can be built into the various hinges and joints of the present invention in a manner that will be apparent to those of skill in the art in view of any particular hinge design.

Preferably, the earstem will be freely laterally pivotable throughout a first range of motion from the folded position to a partially laterally separated position. The earstems are preferably further laterally pivotable from the partially separated position to a fully separated position against a medially directed bias.

Thus, the rearward tips of the earstems may be freely laterally separable to a lateral separation distance within the range of from about 2 inches to about 4 inches and preferably no more than about 3 inches or 3½ inches. Further lateral separation, up to a separation of as much as 6 inches or 7 inches, is accomplished by overcoming the medially directed bias. Since the bias is imparted by a spring or compressible material at the hinge, the earstem may be substantially inflexible such as in the case of a cast titanium part. In this manner, the earstems, without flexing, can accommodate a wide range of head widths.

The predetermined orientation towards which the eyeglass frames are preferably biased is one in which the optical characteristics of the eyeglasses are optimized. In general, as discussed in connection with FIGS. 15–20, the lens is preferably maintained in a predetermined relationship to the theoretical "straight ahead" line of sight of the wearer.

Figure 15:
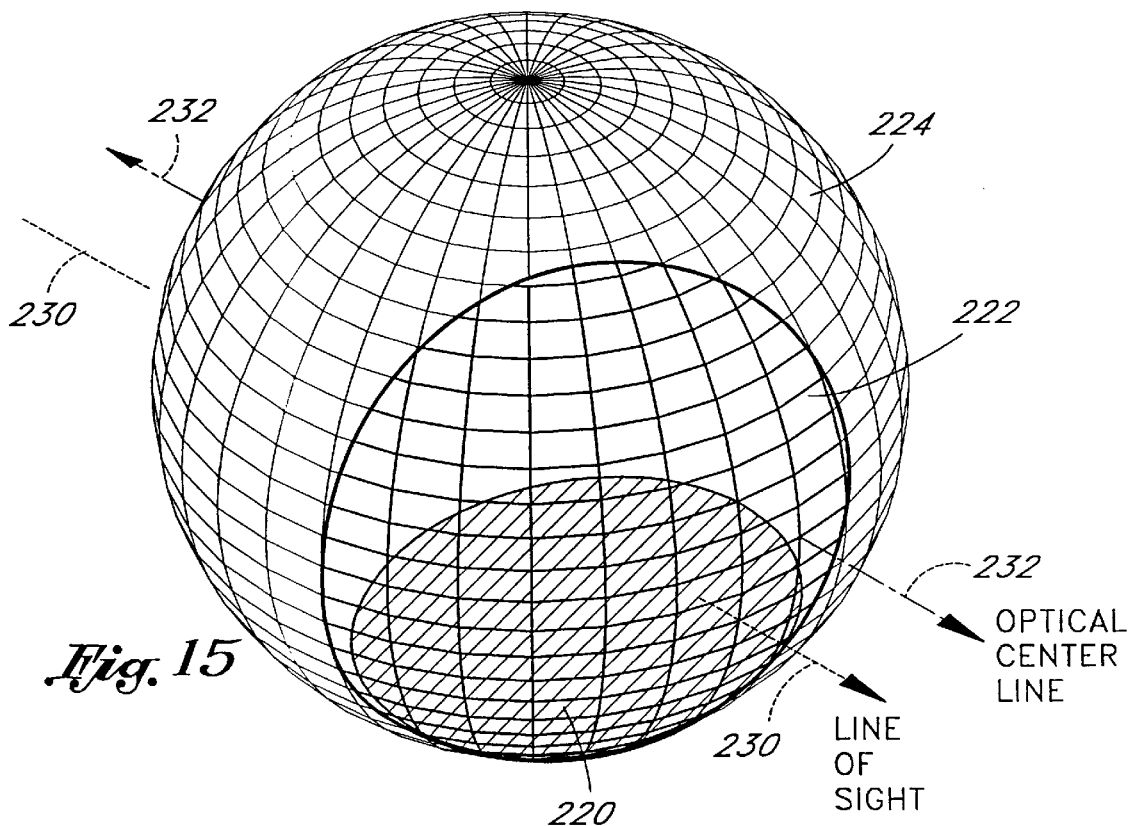
FIG. 15 is a perspective view of a lens blank conforming to a portion of the surface of a sphere, showing a lens profile to be cut from the blank in accordance with a preferred embodiment of the present invention.

FIG. 15 is a perspective view of a lens blank 222, a convex outside surface 236 of which generally conforms to a portion of the surface of a three-dimensional geometric shape 224. It will be understood by those of skill in this art that lenses in accordance with the present invention may conform to any of a variety of geometric shapes.

Preferably, the outside surface of the lens will conform to a shape having a smooth, continuous surface having a constant horizontal radius (sphere or cylinder) or progressive curve (ellipse, toroid or ovoid) or other aspheric shape in either the horizontal or vertical planes. The geometric shape 224 of the preferred embodiments herein described, however, generally approximates a sphere.

Figure 16:
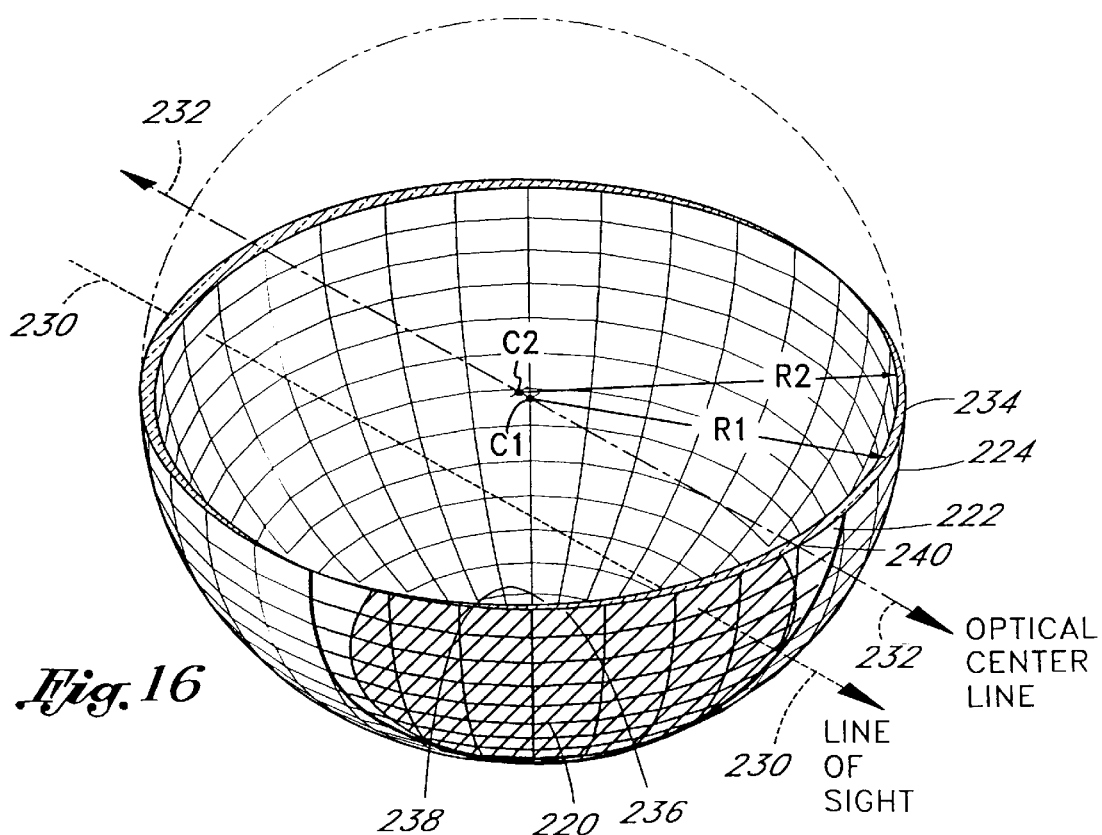
FIG. 16 is a perspective cutaway view of the hollow, tapered wall spherical shape, lens blank, and lens of FIG. 15.

The sphere 224 illustrated in FIGS. 15 and 16 is an imaginary three-dimensional solid walled structure, a portion of the wall of which is suitable from which to cut a lens 220. As is known in the art, precision lens cutting is often accomplished by producing a lens blank 222 from which a lens 220 is ultimately cut. However, it should be clear to those of skill in the art from the illustrations of FIGS. 15 and 16, that the use of a separate lens blank is optional, and the lens 220 may be molded directly into its final shape and configuration if desired.

It can also be seen from FIGS. 15 and 16 that the lens 220 and/or the lens blank 222 can be positioned at any of a variety of locations along the sphere 224. For the purpose of the present invention, the optical centerline 232 operates as a reference line for orientation of the lens 220 with respect to the sphere 224. In the illustrated embodiment, wherein both the outside surface and the inside surface conform to a portion of a sphere, the optical centerline is defined as the line 232 which joins the two centers C1 and C2. The analogous reference line for the purpose of nonspherical lens geometry may be formed in a manner different than connection of the two geometric centers of the spheres, as will be apparent to one of skill in the art.

The lens 220 is ultimately formed in such a manner that it retains the geometry of a portion of the wall of the sphere as illustrated in FIG. 16. The location of the lens 220 on the sphere 224 is selected such that when the lens 220 is oriented in the eyeglass frame, the normal line of sight 230 of the wearer through the lens will be maintained generally in parallel to the optical centerline 232 of the geometric configuration from which the lens 220 was obtained. In the illustration of FIGS. 15 and 16, the lens 220 is a right lens which has a significant degree of wrap, as well as some degree of downward rake (indicated by the as-worn normal line of sight crossing the sphere 224 below the optical centerline 230). A lens having a different shape, or a lesser degree of wrap may overlap the optical centerline 232 of the imaginary sphere 224 from which the lens was formed. However, whether the optical centerline of the imaginary sphere 224 crosses through the lens 220 or not is unimportant, so long as the line of sight 230 in the lens 220 is maintained generally in parallel in the as-worn orientation with the optical centerline 232.

Similarly, if the lens is to have no rake or upward rake in the as-worn orientation, the normal line of sight (and the entire lens) would cross the sphere 224 at or above the central horizontal meridian which contains the optical centerline. The spatial distance and position of the ultimate normal line of sight 230 relative to the optical centerline 232 therefore indicates the degree of wrap (by horizontal distance) and rake (by vertical distance). However, regardless of the distances involved, the lens will exhibit minimal optical distortion as long as the normal line of sight 230 is offset from but maintained substantially parallel to the optical centerline 232 preferably in both the horizontal and vertical planes.

For purposes of the present invention, "substantially parallel" shall mean that the preselected line of sight 230 when the lens 220 is oriented in the as-worn position generally does not deviate within the horizontal or vertical plane by more than about ±15° from parallel to the optical centerline 232. Preferably, the normal line of sight 230 should not deviate by more than about ±10° from the optical centerline 232, more preferably the normal line of sight 230 deviates by no more than about ±5° and most preferably no more than about ±2° from parallel to the optical centerline 232. Optimally, the line of sight 230 is parallel to the optical centerline in the as-worn orientation.

Variations from parallel in the horizontal plane generally have a greater negative impact on the optics than variations from parallel in the vertical plane. Accordingly, the solid angle between the line of sight 230 and optical centerline 232 in the vertical plane may exceed the ranges set forth above, for some eyewear, as long as the horizontal component of the angle of deviation is within the above-mentioned ranges of deviation from the parallel orientation. Preferably, the line of sight 230 deviates in the vertical plane no more than about ±10° and, more preferably, no more than about ±3° from the optical centerline in the as-worn orientation.

FIG. 16 is a cutaway view of the lens 220, lens blank 222, and geometric shape 224 of FIG. 15. This view shows that the preferred geometric shape 224 is hollow with walls of varying thickness, as revealed by a horizontal cross-section 234 at the optical centerline of the geometric shape 224.

The tapered walls of the preferred geometric shape 224 result from two horizontally offset spheres, represented by their center points C1 and C2 and radii R1 and R2. An outer surface 236 of the preferred lens blank 222 conforms to one sphere (of radius R1) while an inner surface 238 of the lens blank 222 conforms to the other sphere (of radius R2). By adjusting the parameters which describe the two spheres, the nature of the taper of the lens blank 222 may also be adjusted.

In particular, the parameters for the two spheres to which the lens blank outer surface 236 and inner surface 238 conform is preferably chosen to produce minimal or zero refractive power, or non-prescription lenses. Where CT represents a chosen center thickness (maximum thickness of the wall of the hollow geometric shape 224), n is an index of refraction of the lens blank material, R1 is set by design choice for the curvature of the outer surface 236, R2 may be determined according to the following equation:

$$R_2 = R_1 - CT + \frac{CT}{n} \quad (1)$$

CT/n represents the separation of the spherical centers C1 and C2. For example, where a base 6 lens is desired as a matter of design choice, the center thickness is chosen to be 3 mm, and the index of refraction of the preferred material (polycarbonate) is 1.586, R2 may be determined as follows:

$$R_2 = \frac{530}{6} - 3 + \frac{3}{1.586} = 87.225 \text{mm} \qquad (2)$$

For this example, the radius R1 of the outer surface 236 is equal to 88.333 mm, the radius R2 of the inner surface 238 is equal to 87.225 mm, and the spherical centers C1 and C2 are separated by 1.892 mm. These parameters describe the curvature of the lens blank 222 of a preferred decentered spherical embodiment.

In the case of the preferred embodiment, the optical centerline 232 is that line which passes through both center points C1 and C2 of the offset spheres. This happens to pass through the thickest portion of the preferred geometrical shape 224 walls at an optical center 240, though this may not be true for alternative nonspherical embodiments. The optical center line 232 happens to pass through surface 236 of the illustrated lens blank 222, although this is not necessary. The optical center 240 does not happen to lie on the lens 220, although it may for larger lenses or lenses intended to exhibit less wrap in the as-worn orientation.

Figure 17:
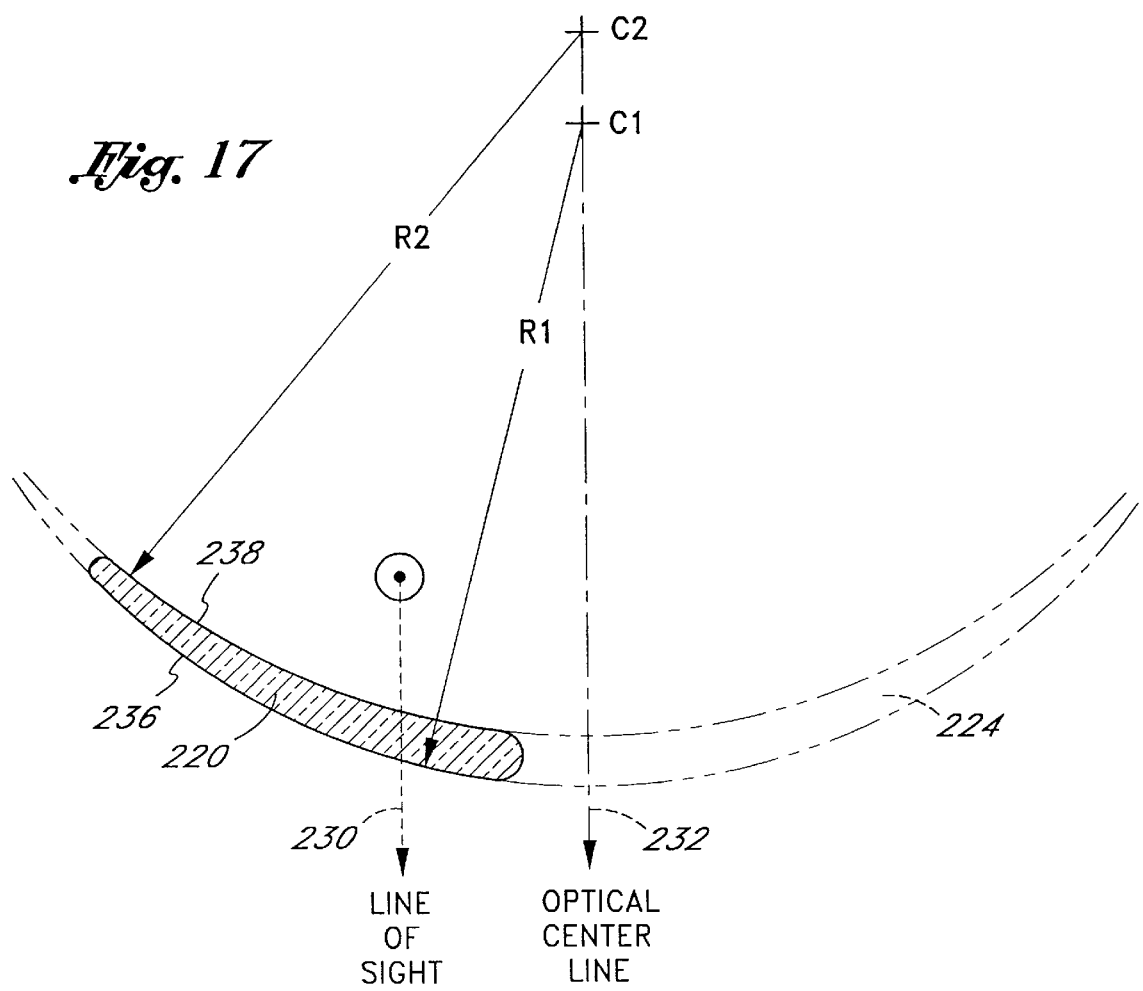
FIG. 17 is a horizontal cross-sectional view of a lens constructed in accordance with a preferred embodiment of the present invention.

FIG. 17 illustrates a horizontal cross-section of a lens 220, showing in phantom the geometric shape 224 to which the outer surface 236 and inner surface 238 conform. The lens blank 222 is omitted from this drawing. In accordance with the present invention, the optical centerline 232 associated with the chosen orientation is aligned to be generally parallel to but offset from the straight ahead normal line of sight 230 of the wearer as the lens 220 is to be mounted in an eyeglass frame.

Figure 17A:
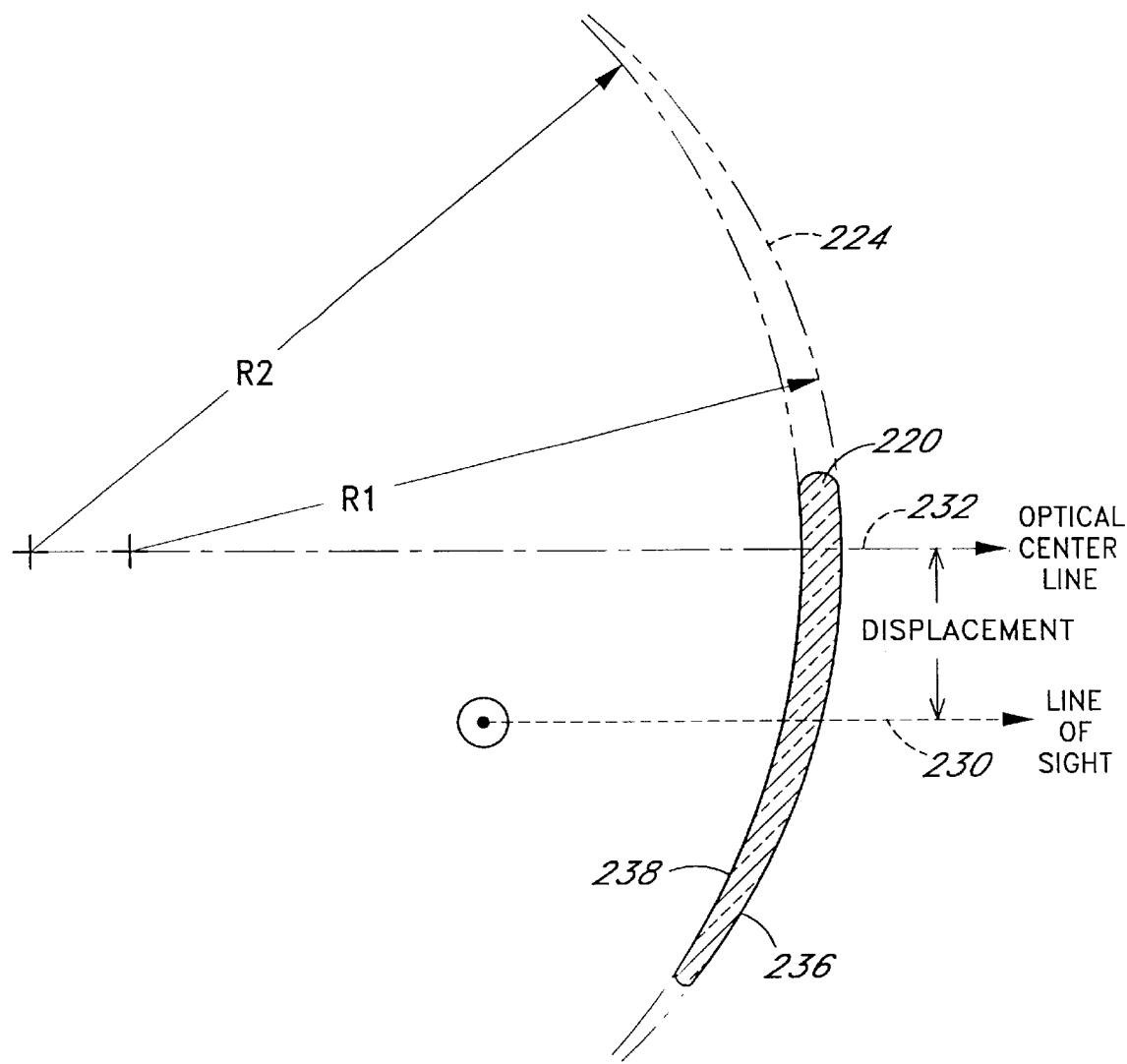
FIG. 17A is a vertical cross-sectional view of a lens constructed in accordance with a preferred embodiment of the present invention.

FIG. 17A illustrates a vertical cross-section of the lens 220, also showing in phantom the geometric shape 224 to which the outer surface 236 and inner surface 238 conform. Unlike the horizontal view of FIG. 17, the projection of the optical centerline 232 onto a vertical plane (i.e., the vertical component of the optical centerline 232) appears to pass through the vertical profile of the preferred lens 220. In any case, the vertical component of the optical centerline 232 associated with the chosen taper is also aligned to be generally parallel with the normal line of sight 230 of the wearer in the as-worn orientation.

Thus, in addition to providing optically correct lenses for dual lens eyewear with a high degree of wrap, the present invention may provide optically corrected lenses for eyewear characterized by a degree of rake. The terms "rake" and "optically correct" are further defined below.

In general, "rake" will be understood to describe the condition of a lens, in the as-worn orientation, for which the normal line of sight 230 (see FIG. 17A) strikes a vertical tangent to the lens 220 at a non-perpendicular angle. For optically corrected eyewear in accordance with the preferred embodiment, however, the normal line of sight to a raked lens is generally parallel to and vertically offset from the optical centerline. Therefore, the degree of rake in a correctly oriented lens may be measured by the distance which the normal line of sight is vertically displaced from the optical centerline.

Figure 19C:
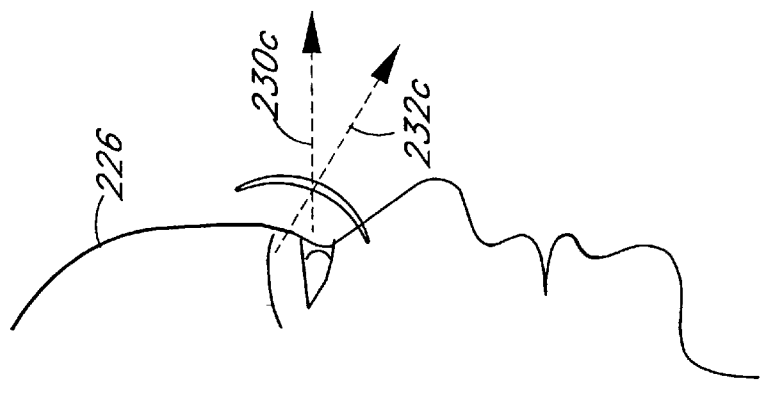
FIGS. 19A–19C are right side elevational views of lenses of various configurations and orientations relative to a wearer.
Figure 19B:
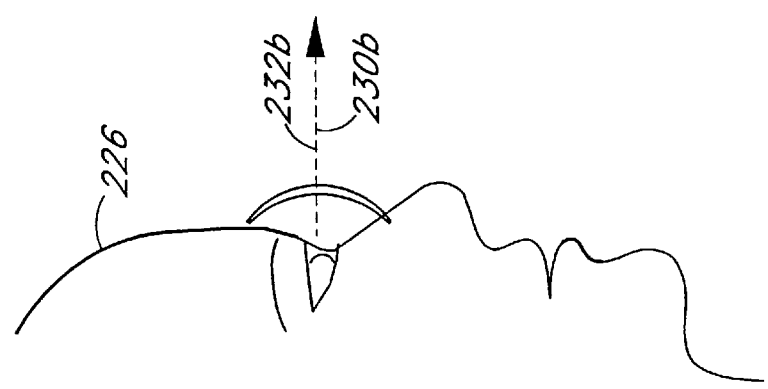

For a centrally oriented lens, as shown in FIG. 19B, the wearer's line of sight coincides with the optical centerline, thus displaying no vertical displacement. While such a lens may be optically corrected (as defined below) in the as-worn orientation, the lens does not have rake, unlike the preferred embodiment of the present invention. FIG. 19C shows a lens orientation which is downwardly tilted or raked, but for which the optical centerline and the normal line of sight are highly divergent such that no "displacement" could meaningfully be measured. While such a lens may have downward rake in a conventional sense, advantageously providing downward protection for the eye and conforming to the wearer's face, it is not optically corrected.

In contrast, the normal line of sight through a raked lens, made in accordance with the preferred embodiment, is characterized by a finite vertical displacement from the optical centerline, preferably a downward displacement for downward rake. Where the optical centerline diverges from the normal line of sight within the acceptable angular ranges set forth above, this displacement should be measured at or near the lens surface. The displacement may range from about any non-zero displacement to about 8.0 inches. Lenses of lower base curvature may require a greater displacement in order to achieve good rake. The vertical displacement for a lens of base 6 curvature, however, should be between about 0.1 inch and about 2.0 inches. More preferably, the vertical displacement is between about 0.1 inch and about 1.0 inch, particularly between about 0.25 inch and about 0.75 inch, and most preferably about 0.5 inch. "Optically correct," as that term has been used in the present description, refers to a lens which demonstrates relatively low distortion as measured by one or more of the following values in the as-worn orientation: prismatic distortion, refractive power and astigmatism. Raked lenses in accordance with the preferred embodiment demonstrate at least as low as ¼ diopters or 3/16 diopters and typically less than about ⅛ diopters prismatic distortion, preferably less than about 1/16 diopters, and more preferably less than about 1/32 diopters. Refractive power and astigmatism for lenses in accordance with the present invention are also preferably low. Each of refractive power and astigmatism are also at least as low as ¼ diopters or 3/16 diopters and preferably less than about ⅛ diopters, more preferably less than about 1/16 diopters and most preferably less than about 1/32 diopters.

It will be understood by the skilled artisan that the advantages in minimizing optical distortion apply to both the horizontal and the vertical dimensions. Particular advantage is derived by applying the principles taught herein to both vertical and horizontal dimensions of the lens, enabling the combination of lateral and lower peripheral protection of the eyes (through wrap and rake) with excellent optical quality over the wearer's full angular range of vision.

Furthermore, although the principal embodiments described herein are of constant radius in both the horizontal and vertical cross-section, a variety of lens configurations in both planes are possible in conjunction with the present invention. Thus, for example, either the outer or the inner or both surfaces of the lens of the present invention may generally conform to a spherical shape as shown in FIGS. 15 and 16. Alternatively either the outer or the inner or both surfaces of the lens may conform to a right circular cylinder, a frusto-conical, an elliptic cylinder, an ellipsoid, an ellipsoid of revolution, other asphere or any of a number of other three dimensional shapes. Regardless of the particular vertical or horizontal curvature of one surface, however, the other surface should be chosen such as to minimize one or more of power, prism and astigmatism of the lens in the mounted and as-worn orientation.

FIGS. 18–20A will aid in describing a method of choosing a location on the lens blank 222 from which to cut the right lens 220, in accordance with a preferred embodiment of the present invention. It will be understood that a similar method would be used to construct the left lens for the dual lens eyewear of the preferred embodiment.

As a first step, a desired general curvature of the lens inner or outer surface 238, 236 may be chosen. For the preferred lens 220, this choice determines the base value of the lens blank 222. As noted elsewhere herein, a number of other curvatures may be utilized in conjunction with the present invention. A choice of lens thickness may also be preselected. In particular, the minimum thickness may be selected such that the lens will withstand a preselected impact force.

A desired lens shape may also be chosen. For example, FIGS. 1 and 9 illustrate examples of a front elevational shapes for the lens 220. The particular shape chosen is generally not relevant to the oriented decentered lens optics disclosed herein.

Figure 18:
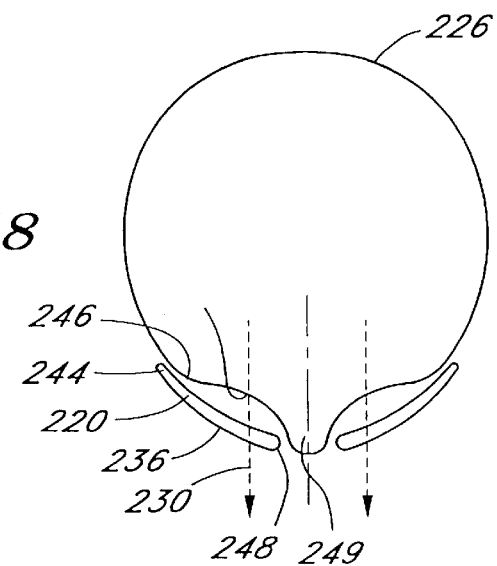
FIG. 18 is a top plan view of the lens of FIG. 17 showing a high wrap in relation to a wearer.

A desired as-worn orientation for the lens should also be chosen, relative to the normal line of sight 230 of the wearer 226. As mentioned above, preferred orientations may provide significant lateral wrap for lateral protection and interception of peripheral light, and for aesthetic reasons, and also some degree of downward rake. For example, the embodiment illustrated in FIGS. 15–20 uses a canted lens 220 to achieve wrap. Alternatively, wrap may be achieved through use of a higher base lens and a more conventional (non-canted) orientation. FIGS. 18 and 19 illustrate more plainly how the orientations may be related to the line of sight 230 of the wearer.

Figure 19A:
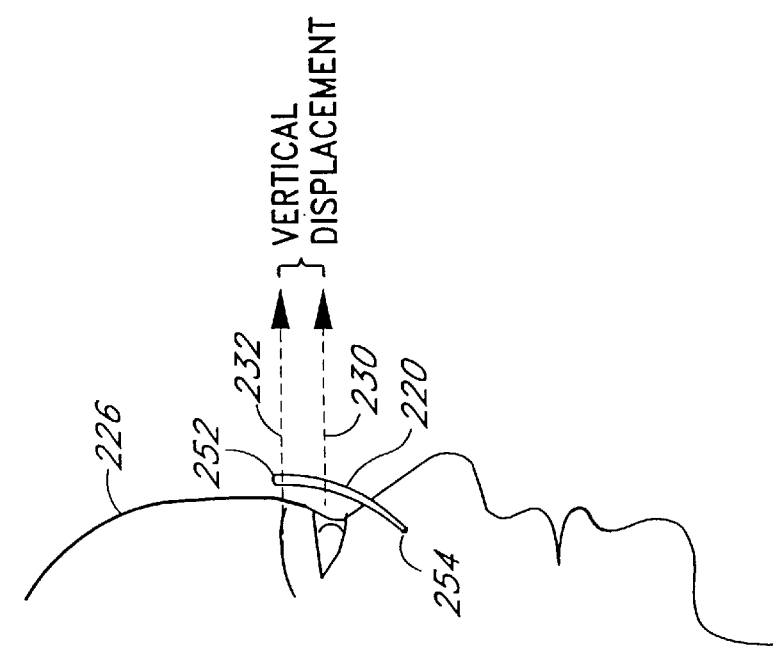
Figure 20A:
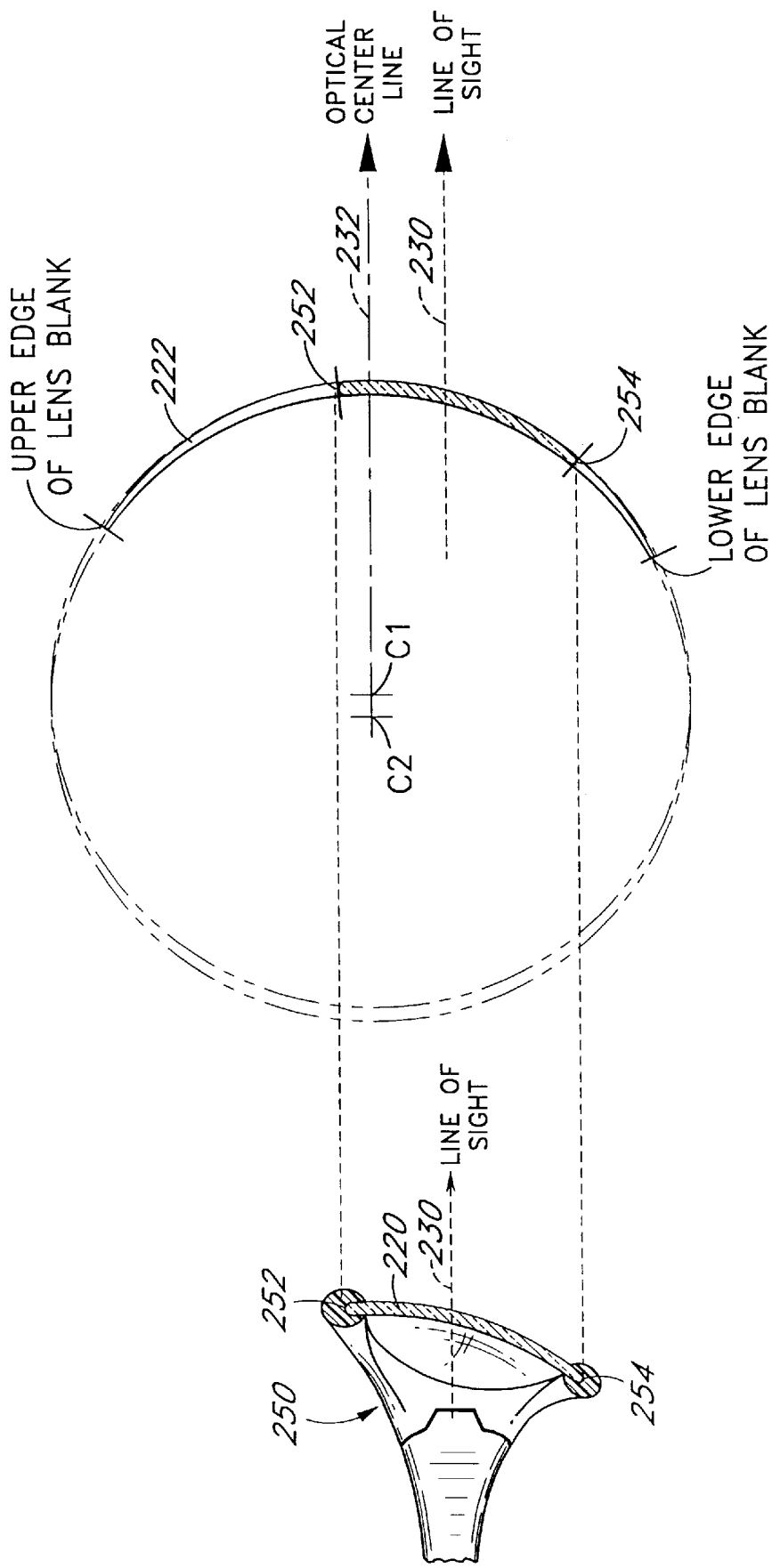
FIG. 20A schematically illustrates the projection of the lens vertical profile from a desired orientation within an eyewear frame to the lens blank, in accordance with a preferred embodiment of the present invention.

The eyewear designer may also choose a degree of rake, or vertical tilt, as will be understood from FIGS. 19A–19C, schematically illustrating various vertical as-worn orientations of a lens, relative to the head of the wearer 226. FIG. 19A illustrates the preferred orientation of the lens 220 relative to the head of the wearer 226, and relative in particular to the straight ahead normal line of sight 230. A downward rake, as illustrated in FIG. 19A, is desirable for a variety of reasons, including improved conformity to common head anatomy. As will be apparent to those of skill in the art in view of the disclosure herein, a lens 220 having a mechanical center point which falls below the horizontal plane intersecting the optical centerline 232 (see FIG. 16) will permit the lens to be oriented with a downward rake as illustrated in FIG. 19 and yet preserve a generally parallel relationship between the optical centerline and the straight ahead line of sight. Since the orientation of the lens 220 to the optical centerline 232 in the imaginary sphere should be the same as the orientation between the lens 220 and a parallel to the normal line of sight 230 in the as-worn orientation any lens cut from this sphere below the optical centerline 232 can be mounted with a corresponding degree of downward rake and achieve the optical correction of the present invention.

Accordingly, the desired degree of rake may be chosen by specifying a vertical component of the displacement between the normal line of sight 230 and the optical centerline 232, as illustrated in FIG. 19A. Either way, the greater the displacement, the greater the downward rake. In general, the vertical displacement in accordance with the present invention will be greater than zero. Generally it will be from about 0.1 inches to about 2 inches depending upon base curvature. Preferably, vertical displacement will be from about 0.1 inches to about one inch, or about 0.2 inches or greater. More preferably, it will be from about 0.25 inches to about 0.75 inches and in one embodiment it was about 0.5 inches.

Alternatively, a general profile may be chosen which fixes an orientation of the normal line of sight relative to the curvature of the lens (not accounting for the thickness of the lens). For instance, both FIG. 19A provides reference points of a top edge 252 and a bottom edge 254 relative to the normal line of sight 230. This relationship may then be utilized to determine the position on a lens blank from which to cut the lens, as will be clear from the discussion of FIG. 20A below.

Referring now to FIG. 20, a mapping of the horizontal orientation of the lens 220 onto the lens blank 222 is illustrated. The normal line of sight 230, with respect to which the chosen orientation is measured, is maintained substantially parallel to and offset from the optical centerline 232. The horizontal component of the displacement will generally be within the range of from about 0.1 inches to about 8 inches for lower base curvatures. Additional details relating to lens orientation can be found in copending application Ser. No. 08/745,162, filed Nov. 7, 1996, entitled Decentered Noncorrective Lens For Eyewear, the disclosure of which is incorporated herein by reference.

Although the foregoing invention has been described in terms of certain preferred embodiments, other embodiments will become apparent to those of ordinary skill in the art in view of the disclosure herein. Accordingly, the present invention is not intended to be limited by the recitation of preferred embodiments, but is intended to be defined solely by reference to the appended claims.

What is claimed:

1. An eyeglass, containing a nonpowered decentered eyeglass lens which is optically corrected in an as-worn orientation with respect to the normal line of sight of a wearer, comprising:

an investment cast metal frame; and at least one lens attached to the frame and positioned by the frame such that the lens is adapted to have a predetermined orientation with respect to the wearer's normal line of sight, said lens having an outer surface conforming to a portion of the surface of a first sphere having a first center and an inner surface conforming to a portion of the surface of a second sphere having a second center, and an optical centerline extending through the first and second centers;

wherein the frame maintains the lens in an as-worn orientation such that the optical centerline is adapted to be maintained substantially parallel to and spaced vertically and horizontally apart from the wearer's normal line of sight.

2. An eyeglass according to claim 1, wherein the optical centerline is adapted to deviate from absolutely parallel to the wearer's normal line of sight by no more than about 3° in at least one of the vertical and horizontal planes.

3. An eyeglass according to claim 1, wherein the optical centerline is adapted to be spaced more than about 0.1 inch, as measured along said outer surface of said lens, from the wearer's normal line of sight in the vertical plane.

4. An eyeglass according to claim 1, wherein the optical centerline is adapted to be spaced at least about 0.5 inch, as measured along said outer surface of said lens, from the wearer's normal line of sight in at least one of the vertical and horizontal planes.

5. An eyeglass according to claim 1, wherein the optical centerline is adapted to be vertically displaced between about 0.25 inch and about 0.75 inch, as measured along said outer surface of said lens, from the wearer's normal line of sight.

6. An eyeglass as in claim 1, wherein the prismatic distortion in the as-worn orientation is no more than about ⅛ diopters.

7. An eyeglass according to claim 1, wherein the optical centerline is adapted to deviate from absolutely parallel to the wearer's normal line of sight by no more than about 5° in at least one of the vertical and horizontal planes.

8. An eyeglass according to claim 1, wherein the optical centerline is adapted to deviate from absolutely parallel to the wearer's normal line of sight by no more than about 10° in at least one of the vertical and horizontal planes.

9. An eyeglass containing a nonpowered decentered eyeglass lens, comprising:
- a frame adapted to permit limited bending movement upon application of an external force, said frame being biased to return to a predetermined configuration upon removal of the external force; and
- at least one lens attached to said frame, said lens having an outer surface conforming to a portion of a surface of a first sphere having a first center and an inner surface conforming to a portion of a surface of a second sphere having a second center, and an optical centerline extending through the first and second centers;
    - wherein said frame is adapted to maintain said lens in an as-worn orientation with both wrap and rake such that the optical centerline is substantially parallel to and spaced vertically and horizontally apart from the wearer's normal line of sight.

10. An eyeglass according to claim 9, wherein said frame comprises:
- a lens support affixed to said lens;
- first and second earstems each having an anterior end, a posterior end, and a fulcrum at or near said anterior end, said first and second earstems being pivotably connected to said lens support at the fulcrum such that said earstems are freely laterally pivotable through a first range of motion from a folded position to a position wherein said earstems are laterally separated from each other; and
- a biasing structure that imparts a force on said first and second earstems when said earstems are laterally pivoted through a second range of motion wherein said posterior ends of said earstems are laterally separated a predetermined distance from each other.

11. An eyeglass according to claim 10, wherein said earstems are freely laterally pivotable to a position where said posterior ends are laterally separated a distance of at least about 2 inches.

12. An eyeglass according to claim 11, wherein said earstems are freely laterally pivotable to a position where said posterior ends are laterally separated a distance of at least about 3 inches.

13. An eyeglass according to claim 11, wherein said biasing structure imparts a force on said first and second earstems when said earstems are laterally pivoted such that said posterior ends of said earstems are laterally separated a distance of more than 3 inches.

14. An eyeglass according to claim 10, wherein said biasing structure imparts a force on said first and second earstems when said earstems are laterally pivoted such that said posterior ends of said earstems are laterally separated a distance of more than 3½ inches.

15. An eyeglass according to claim 10, wherein said biasing structure comprises a compressible pad.

16. An eyeglass according to claim 10, wherein said biasing structure comprises an elastic band.

17. An eyeglass according to claim 10, wherein said biasing structure comprises a spring.

18. An eyeglass according to claim 9, wherein said frame comprises:
- a lens support affixed to said lens, said lens support having a connector;
- a link pivotably connected to said lens support at said connector such that said link is laterally pivotable about said connector; and
- an earstem having an earstem connector, said earstem being pivotably connected to said link at said earstem connector such that said earstem is laterally pivotable about said earstem connector.

19. An eyeglass according to claim 18, wherein said earstem is pivotable through a range of at least about 90°.

20. An eyeglass according to claim 18, wherein said link is pivotable through a range of no more than about 10°.

21. An eyeglass according to claim 18, wherein said link is pivotable through a range of no more than about 5°.

* * * * *